US012675175B2

(12) United States Patent
Li et al.

(10) Patent No.: US 12,675,175 B2
(45) Date of Patent: Jul. 7, 2026

(54) METHOD OF CONTROLLING STYLUSES AND RELATED STYLUS CONTROL CIRCUIT

(71) Applicant: NOVATEK Microelectronics Corp., Hsin-Chu (TW)

(72) Inventors: Jyun-Sian Li, Hsinchu County (TW); Jyun-Yu Jhang, Kaohsiung City (TW); Ta-Keng Weng, Taichung City (TW); Yuan-Fu Hsueh, Hsinchu City (TW); Yun-Hsiang Yeh, Hsinchu City (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 11 days.

(21) Appl. No.: 18/818,630

(22) Filed: Aug. 29, 2024

(65) Prior Publication Data

US 2025/0130654 A1     Apr. 24, 2025

Related U.S. Application Data

(60) Provisional application No. 63/545,538, filed on Oct. 24, 2023.

(51) Int. Cl.
| | |
|---|---|
| *G06F 3/0354* | (2013.01) |
| *G06F 3/038* | (2013.01) |
| *G06F 3/044* | (2006.01) |
| *H04W 72/21* | (2023.01) |
| *H04W 72/23* | (2023.01) |

(52) U.S. Cl.
CPC ........ *G06F 3/03545* (2013.01); *G06F 3/0383* (2013.01); *G06F 3/0441* (2019.05); *G06F 3/0442* (2019.05); *H04W 72/21* (2023.01); *H04W 72/23* (2023.01)

(58) Field of Classification Search
CPC .............. G06F 3/04162; G06F 3/0383; G06F 3/03545; G06F 3/0441; H04W 72/23; H04W 72/21
See application file for complete search history.

(56) References Cited

U.S. PATENT DOCUMENTS

| | | | | |
|---|---|---|---|---|
| 11,132,073 | B1 * | 9/2021 | Lin | G06F 3/03545 |
| 11,449,170 | B2 * | 9/2022 | Yeh | G06F 3/0442 |
| 11,625,121 | B2 * | 4/2023 | Cheng | G06F 3/03545 |
| | | | | 345/179 |
| 11,755,130 | B2 * | 9/2023 | Hisano | G06F 3/03545 |
| | | | | 345/179 |
| 12,032,781 | B1 * | 7/2024 | Cheng | G06F 3/03545 |
| 12,045,422 | B2 * | 7/2024 | Lee | G06F 3/0441 |

(Continued)

FOREIGN PATENT DOCUMENTS

| | | |
|---|---|---|
| CN | 110851006 A | 2/2020 |
| CN | 111580690 A | 8/2020 |

(Continued)

*Primary Examiner* — Olga V Merkoulova
(74) *Attorney, Agent, or Firm* — Winston Hsu

(57) ABSTRACT

A method for controlling a plurality of types of styluses includes steps of: outputting a first uplink signal corresponding to a first type of stylus among the plurality of types of styluses, to detect the first type of stylus; and outputting a second uplink signal corresponding to a second type of stylus among the plurality of types of styluses, to detect the second type of stylus. The second type is different from the first type.

34 Claims, 24 Drawing Sheets

(56) References Cited

U.S. PATENT DOCUMENTS

| | | | | |
|---|---|---|---|---|
| 2020/0210021 | A1* | 7/2020 | Ju ........................ | G06F 3/04162 |
| 2021/0325980 | A1* | 10/2021 | Lin ........................ | G06F 3/0416 |
| 2021/0373731 | A1* | 12/2021 | Yeh ........................ | G06F 3/0441 |
| 2022/0334701 | A1* | 10/2022 | Cheng ................... | G06F 3/0441 |
| 2025/0130654 | A1* | 4/2025 | Li ........................ | G06F 3/04162 |

FOREIGN PATENT DOCUMENTS

| | | | |
|---|---|---|---|
| TW | 202141243 | A | 11/2021 |
| TW | 202240351 | A | 10/2022 |

* cited by examiner

Detect the downlink signals of
multiple types of easy pens in
different frequencies

1904

Determine whether a signal
in any frequency(s) corresponding to
any easy pen(s) is detected No Yes

1906

Switch to the touch and stylus mode
to obtain the sensing information of
the detected easy pen(s)

METHOD OF CONTROLLING STYLUSES AND RELATED STYLUS CONTROL CIRCUIT

CROSS REFERENCE TO RELATED APPLICATIONS

This application claims the benefit of U.S. Provisional Application No. 63/545,538, filed on Oct. 24, 2023. The content of the application is incorporated herein by reference.

BACKGROUND OF THE INVENTION

1. Field of the Invention

The present invention relates to a method of controlling styluses, and more particularly, to a method of controlling different types of styluses and a related stylus control circuit.

2. Description of the Prior Art

An active stylus is a common peripheral device used for an electronic device having a touch panel, such as a mobile phone or laptop. Currently available touch panels having stylus sensing functions on the market have various protocols, such as the Wacom Generic Protocol (WGP) proposed by Wacom, Universal Stylus Initiative (USI) protocol proposed by Google, and Microsoft Pen Protocol (MPP) proposed by Microsoft.

In the prior art, a touch panel could only support stylus sensing based on a specific protocol; that is, only those active styluses having the same protocol could be detected by the touch panel. For example, a touch panel in a Wacom system could only detect the active styluses conforming to the WGP, and a touch panel in a Google system could only detect the active styluses conforming to the USI protocol.

SUMMARY OF THE INVENTION

It is therefore an objective of the present invention to provide a novel method of controlling different types of styluses and a related stylus control circuit, which can support multiple stylus protocols, and also support the reception of downlink signals output by a unidirectional stylus.

An embodiment of the present invention discloses a method for controlling a plurality of types of styluses. The method comprises steps of: outputting a first uplink signal corresponding to a first type of stylus among the plurality of types of styluses, to detect the first type of stylus; and outputting a second uplink signal corresponding to a second type of stylus among the plurality of types of styluses, to detect the second type of stylus. The second type is different from the first type.

Another embodiment of the present invention discloses a stylus control circuit used to control a plurality of types of styluses. The stylus control circuit outputs a first uplink signal corresponding to a first type of stylus among the plurality of types of styluses, to detect the first type of stylus; and outputs a second uplink signal corresponding to a second type of stylus among the plurality of types of styluses, to detect the second type of stylus. The second type is different from the first type.

Another embodiment of the present invention discloses a method for controlling a plurality of types of styluses. The method comprises steps of: outputting a first uplink signal corresponding to a first type of stylus among the plurality of types of styluses; detecting the first type of stylus by detecting a first downlink signal in response to the first uplink signal; and detecting a second type of stylus among the plurality of types of styluses by detecting a second downlink signal corresponding to the second type of stylus. The second type is different from the first type.

Another embodiment of the present invention discloses a stylus control circuit used to control a plurality of types of styluses. The stylus control circuit outputs a first uplink signal corresponding to a first type of stylus among the plurality of types of styluses; detects the first type of stylus by detecting a first downlink signal in response to the first uplink signal; and detects a second type of stylus among the plurality of types of styluses by detecting a second downlink signal corresponding to the second type of stylus. The second type is different from the first type.

Another embodiment of the present invention discloses a method for controlling a plurality of types of styluses. The method comprises steps of: detecting a first type of stylus among the plurality of types of styluses by detecting a first downlink signal corresponding to the first type of stylus; and detecting a second type of stylus among the plurality of types of styluses by detecting a second downlink signal corresponding to the second type of stylus. The second type is different from the first type.

Another embodiment of the present invention discloses a stylus control circuit used to control a plurality of types of styluses. The stylus control circuit detects a first type of stylus among the plurality of types of styluses by detecting a first downlink signal corresponding to the first type of stylus; and detects a second type of stylus among the plurality of types of styluses by detecting a second downlink signal corresponding to the second type of stylus. The second type is different from the first type.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2 is a timing diagram of a touch control system implemented with an out-cell touch sensing technique.

DETAILED DESCRIPTION

Figure 1:
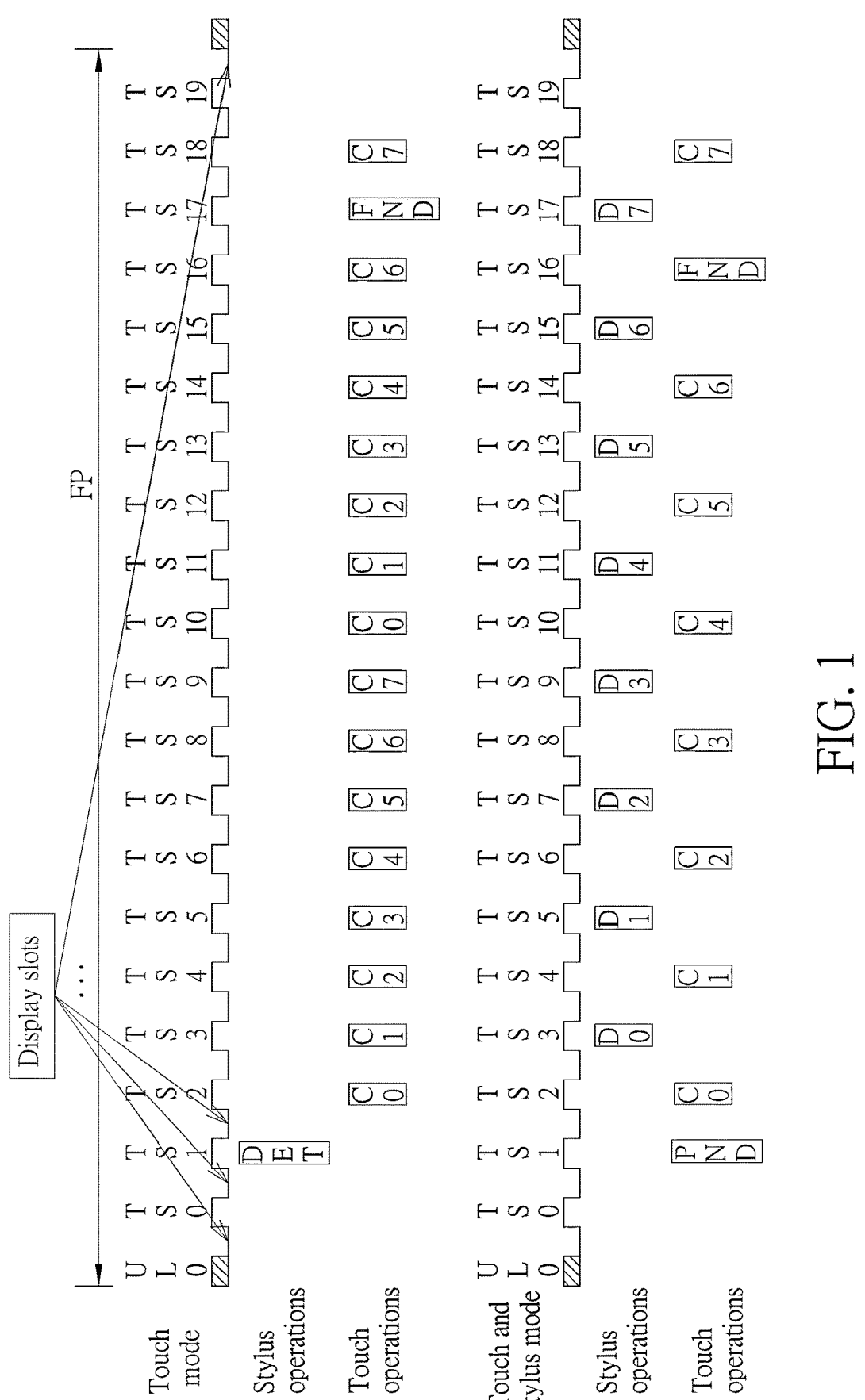
FIG. 1 is a timing diagram of a touch control system implemented as a TDDI system.

FIG. 1 is a timing diagram of a touch control system implemented as a touch and display driver integration (TDDI) system. The TDDI system may include a touch panel controlled by a TDDI integrated circuit (IC). The touch panel may be a screen having display functions, and there are touch sensing electrodes deployed on the screen to perform touch sensing and stylus sensing. The touch sensing functions may be applied to detect finger or hand touch on the screen, where the capacitive touch sensing or any other touch sensing technique may be applied to realize the touch sensing operations. The stylus sensing functions may be applied to detect an active stylus that may contact the screen or hover on the screen. The active stylus may negotiate with the touch control system by using a specific protocol.

Therefore, the control timing of the touch control system may be divided into display time and touch time, where the display time is used for performing display operations, and the touch time is used for performing touch sensing and stylus sensing operations. Since the touch and display functions are integrated in the TDDI system, the touch/stylus sensing operations and the display operations are performed time-divisionally, to be implemented in different time slots. In detail, as shown in FIG. 1, a frame period FP may be divided into multiple time slots, which are allocated to display and touch operations alternately. In the frame period FP, there are 21 time slots used for touch/stylus sensing (regarded as touch slots), which include an uplink slot UL0 and 20 downlink slots TS0-TS19. Other time slots between these touch slots are display slots, in which the display operations are performed.

First, the touch control system may be predefined to be in a touch mode when no active stylus is detected. In the touch mode, most downlink slots may be allocated to touch sensing, where a touch driving signal may be output to the touch sensing electrodes column by column (e.g., from C0 to C7), to receive the corresponding touch sensing signals.

A downlink slot TS1 is allocated to stylus detection (i.e., DET), where the TDDI circuit may detect whether a stylus is contacting or approaching the touch panel. The TDDI circuit may output an uplink signal in the uplink slot UL0. If a stylus nearby receives the uplink signal, it may return a downlink signal in the designated time slot TS1, allowing the TDDI circuit to receive the downlink signal. In other words, the TDDI circuit may detect the stylus by detecting the downlink signal in the downlink slot TS1.

If a stylus is detected, the touch control system may enter a touch and stylus mode. In the touch and stylus mode, the TDDI circuit may start to receive the downlink data (e.g., from D0 to D7) from the stylus, and thereby allocate more downlink slots in the frame period FP to perform stylus sensing and receive the downlink data. Note that the touch sensing operations scan throughout the touch panel (from C0 to C7) twice in one frame period in the touch mode. In the touch and stylus mode, however, since the number of time slots allocated to touch sensing is reduced, the report rate for the touch sensing operations may be reduced since the touch panel is scanned only once in the frame period FP.

In general, during the touch and stylus sensing process, the touch control system is requested to perform noise detection in several time slots (marked as END or PND). END is used to obtain environmental noises that may interfere with the finger touch sensing. PND is used to obtain noises on different frequencies that are selectable by the stylus, allowing the stylus to select a noiseless frequency. The noise detection operations are necessary during the touch and stylus sensing operations, to improve the anti-noise capability of the touch control system. Note that the noise detection operations may be performed in any appropriate time slots, which are not limited to the implementations illustrated in this disclosure.

Figure 2:
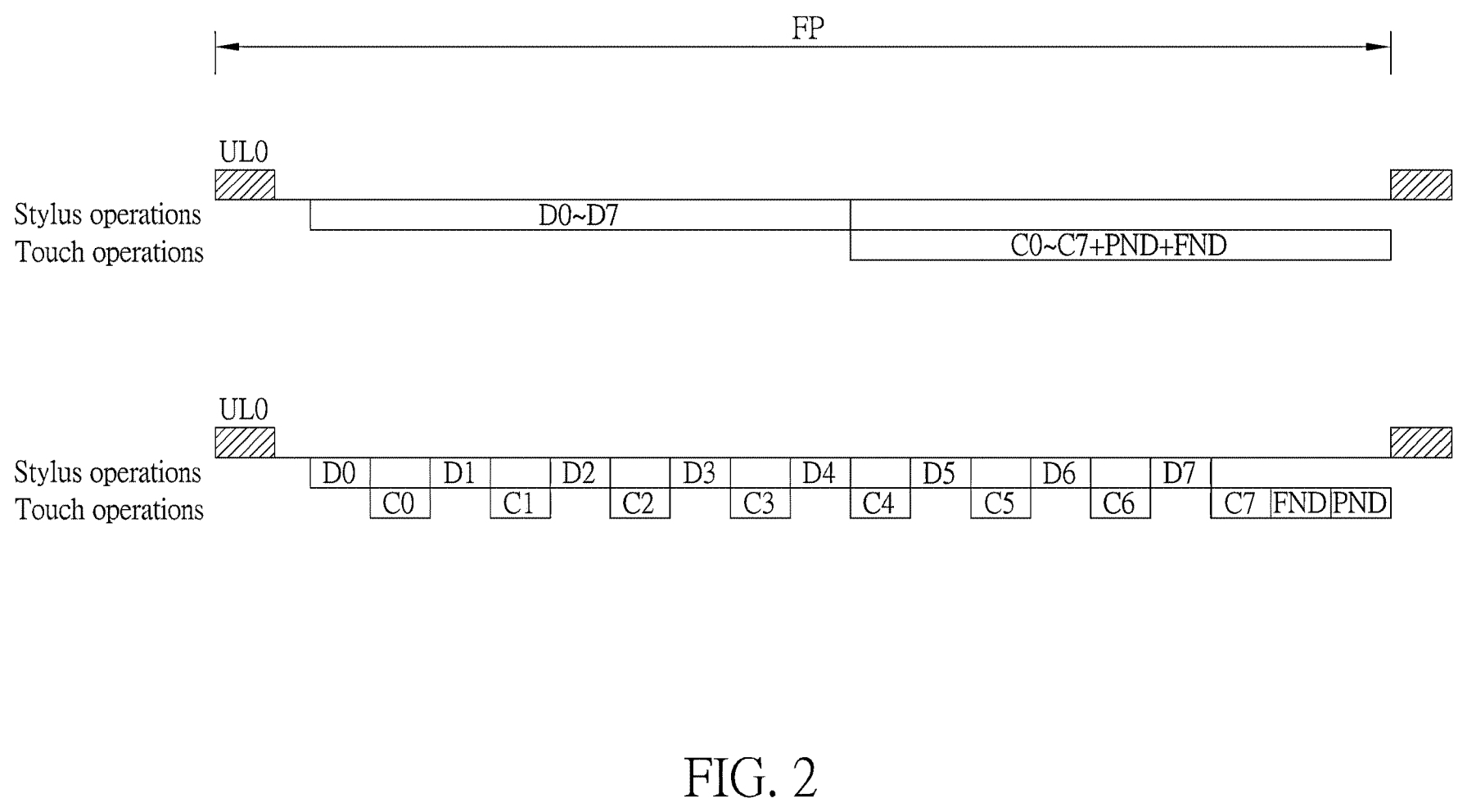

FIG. 2 is a timing diagram of a touch control system implemented with an out-cell touch sensing technique. The touch control system may include a touch panel controlled by discrete touch control circuit and display control circuit. Therefore, the control timing of touch and stylus sensing may be allocated without preserving the display timing. As shown in FIG. 2, a frame period FP may have an uplink period or uplink slot UL0 in the beginning, which is followed by a stylus sensing period for receiving downlink data of a stylus (e.g., from D0 to D7) and then a touch sensing period for performing touch sensing column by column (e.g., from C0 to C7) along with noise detection, as the control timing shown in the upper half of FIG. 2. Alternatively, the stylus downlink data and the touch signals may be received alternately, as the control timing shown in the lower half of FIG. 2.

In a conventional touch control system, it only supports a specific protocol, and thus only the active styluses with this protocol could be detected by the touch control system and perform interaction with the touch panel. For example, if the touch control system supports the Wacom Generic Protocol (WGP), the corresponding stylus should be dedicated to the WGP; or if the touch control system supports the Universal Stylus Initiative (USI) protocol, the corresponding stylus should be dedicated to the USI protocol.

Different from the conventional touch control system, a touch control system of the present invention may support multiple types of styluses with different protocols (i.e., active styluses), and/or may also support one or more unidirectional styluses that output downlink signals in a predetermined frequency. The control timing of the touch control system may be predefined in any appropriate manner, to be allocated in the time slots of the frame period FP.

Figure 3:
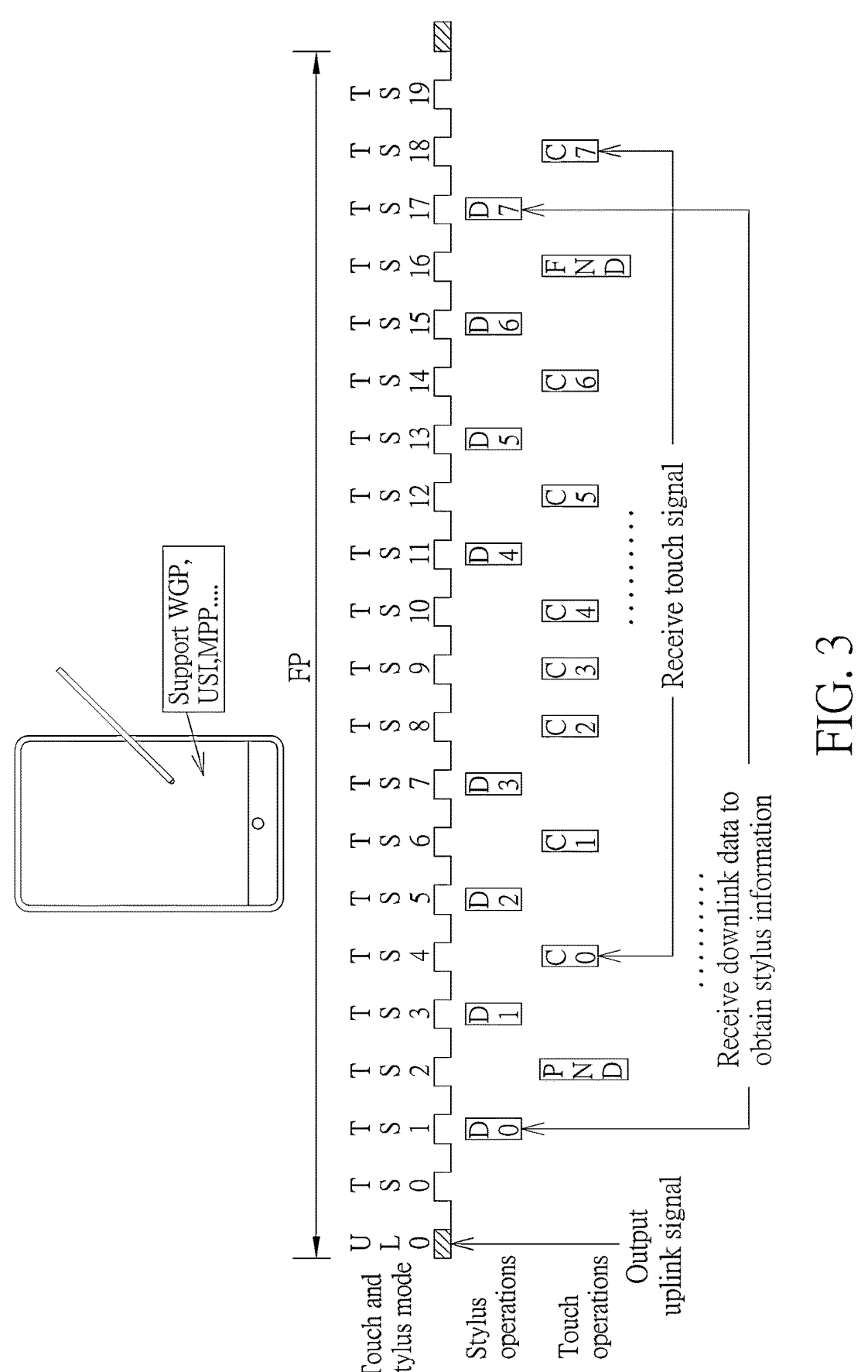
FIG. 3 is a timing diagram of a touch control system supporting multiple types of active styluses and unidirectional styluses according to an embodiment of the present invention.

For example, as shown in FIG. 3, the TDDI circuit in a touch control system operated in the touch and stylus mode may first output an uplink signal (in the time slot UL0) which may be receivable by one of various types of styluses. The follow-up downlink slots TS0-TS19 are allocated in an appropriate manner, to receive the downlink signal/data of the stylus to obtain stylus information (e.g., from D0 to D7), or perform hand/finger touch sensing by receiving touch signals (e.g., from C0 to C7). The control timing may be predefined for each protocol. The corresponding TDDI circuit may obtain the downlink data of the stylus in several time slots to calculate and obtain various sensing information of the stylus, such as the stylus's coordinate, power level, or any other information. In other time slots for touch sensing, the TDDI circuit may receive the touch signals to calculate the finger touch coordinate, touch strength, or any other information. The touch control system may support various types of protocols, which include, but not limited to, the WGP, USI, Microsoft Pen Protocol (MPP), Lenovo Pen Protocol (LPP), Huawei Pen Protocol (HPP), a low-cost active pen, and an easy pen such as the third-party Apple Pen.

Figure 4:
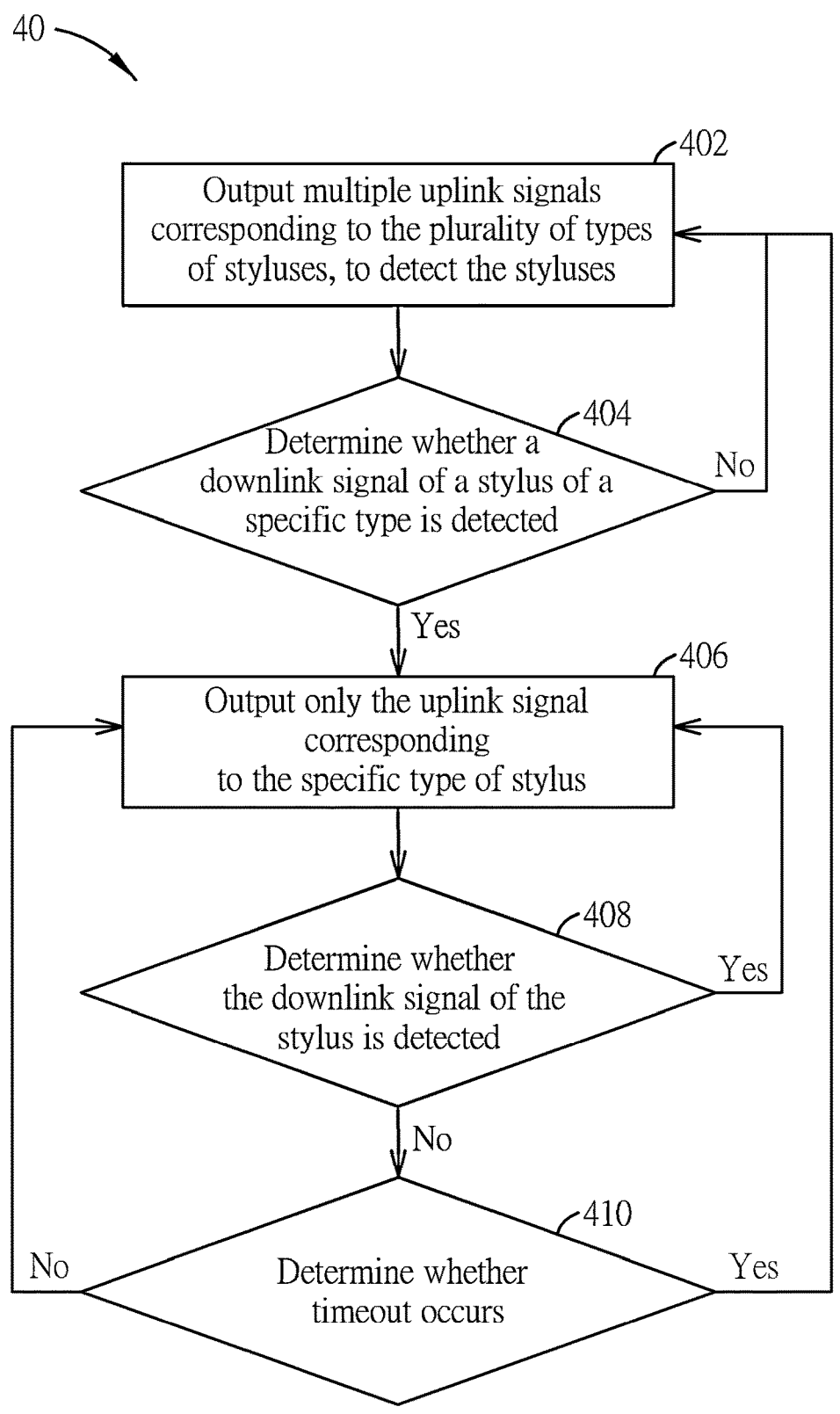
FIG. 4 is a flowchart of a process according to an embodiment of the present invention.

Since the touch control system could support different types of styluses, the corresponding TDDI circuit should be operated adaptively to detect these styluses, and communicate with a stylus of any type after this stylus is detected. For example, FIG. 4 is a flowchart of a process 40 according to an embodiment of the present invention. The process 40 specifies the operations of a stylus control circuit which may be included in a TDDI circuit, to control a plurality of types of styluses. As shown in FIG. 4, the process 40 includes the following steps:

Step 402: Output multiple uplink signals corresponding to the plurality of types of styluses, to detect the styluses.

Step 404: Determine whether a downlink signal of a stylus of a specific type is detected. If yes, go to Step 406; otherwise, go to Step 402.

Step 406: Output only the uplink signal corresponding to the specific type of stylus.

Step 408: Determine whether the downlink signal of the stylus is detected. If yes, go to Step 406; otherwise, go to Step 410.

Step 410: Determine whether timeout occurs. If yes, go to Step 402; otherwise, go to Step 406.

According to the process 40, the stylus control circuit may output multiple uplink signals of different protocols for different types of styluses (Step 402), where the uplink signals may include a first uplink signal corresponding to a first type of styluses (e.g., with a first protocol) and a second uplink signal corresponding to a second type of styluses (e.g., with a second protocol). Based on the corresponding uplink signal, the stylus control circuit may detect the stylus by determining whether the downlink signal is detected (Step 404). The stylus control circuit may continuously and alternately output these uplink signals until the downlink signal of a stylus is successfully detected and received.

After a stylus of a specific type is detected, the stylus control circuit may output only the corresponding uplink signal (Step 406). By using the uplink signal, the stylus control circuit may start to communicate with the stylus with the corresponding protocol. In response to a specific uplink signal corresponding to a protocol, if a downlink signal is received, the stylus control circuit may determine that there is a stylus with this protocol that needs to perform communications. For example, the stylus control circuit may output an uplink signal following the WGP specification, and if a downlink signal is received in response to this uplink signal, the stylus control circuit may determine that there is a WGP stylus approaching or contacting the touch panel. Since the WGP stylus is detected, the stylus control circuit may start to communicate with the WGP stylus based on the signal format and control timing of the WGP. In another situation, the stylus control circuit may receive a downlink signal in response to an uplink signal which is output following the USI specification, and thus determine that there is a USI stylus approaching or contacting the touch panel. Since the USI stylus is detected, the stylus control circuit may start to communicate with the USI stylus based on the signal format and the control timing of the USI protocol. Therefore, the stylus control circuit may receive the downlink data from the stylus based on the determined protocol, in order to obtain various sensing information of the stylus such as its coordinate.

Note that the first type of stylus with the first protocol and the second type of stylus with the second protocol may apply the same timing allocation such as the timing shown in FIG. 3, or apply different timing allocations having different numbers and/or lengths of time slots. As long as different types of styluses could be detected by a stylus control circuit in any manner to perform subsequent communications, the related implementations should belong to the scope of the present invention.

During the process of communicating with the detected stylus, the stylus control circuit may still determine whether the downlink signal or data of this stylus is detected or received (Step 408). If the stylus control circuit fails to receive the downlink signal or data for too long, it may determine that the timeout occurs (Step 410), and the flow may return to the step of alternately outputting multiple uplink signals for different types of styluses. In other words, the stylus control circuit may restart to output the uplink signals corresponding to other types of styluses after not receiving the downlink signal for a specific period of time. The length of this specific period of time may be preset in advance.

Figure 5:
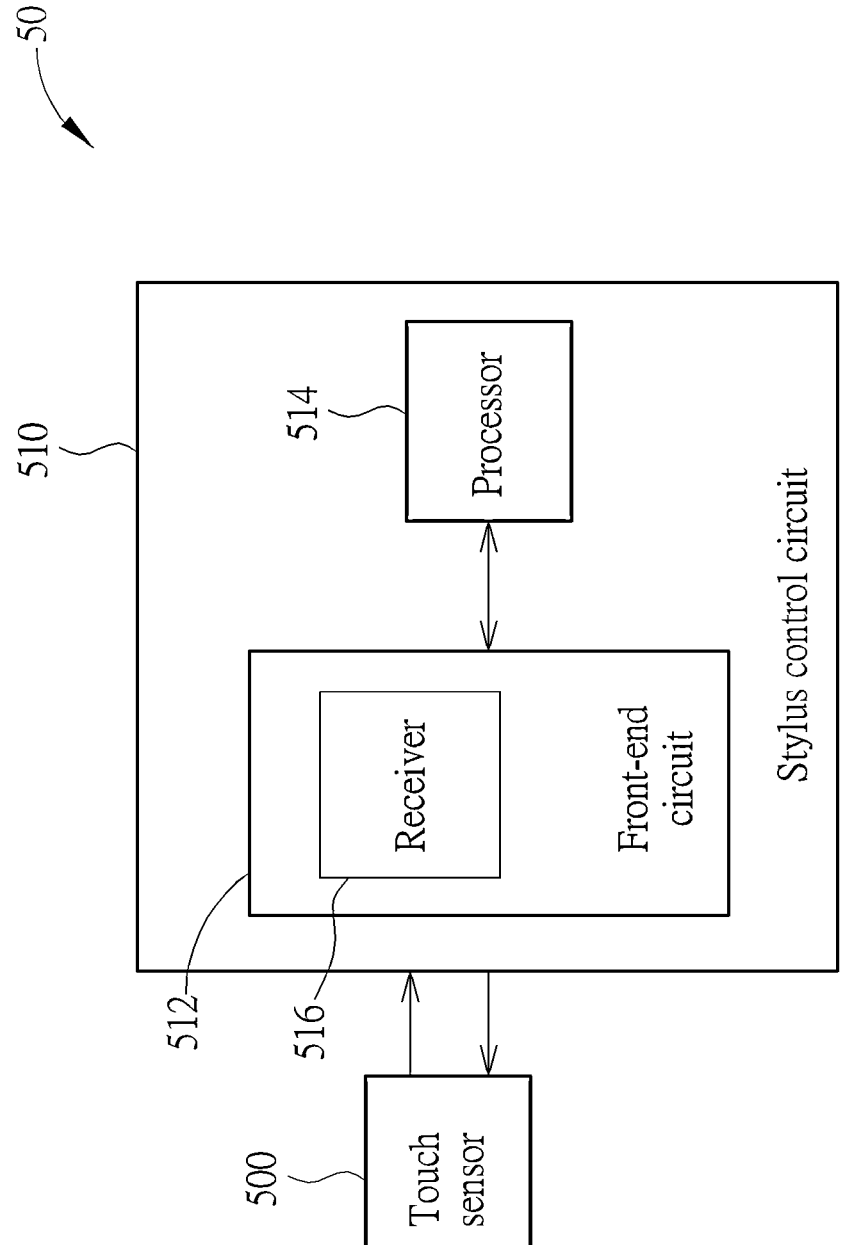
FIG. 5 is a schematic diagram of a stylus control system according to an embodiment of the present invention.

FIG. 5 is a schematic diagram of a stylus control system 50 according to an embodiment of the present invention. The stylus control system 50, which may be integrated in a touch control system, includes a touch sensor 500 and a stylus control circuit 510. The touch sensor 500 may be a touch sensing device implemented on a touch panel. The touch sensor 500 may include a plurality of touch sensing electrodes deployed on the touch surface of the touch panel, where the touch sensing electrodes are capable of forwarding signals to and from the stylus, allowing the stylus control system 50 to communicate with the stylus.

The stylus control circuit 510 is a circuit device responsible for controlling the stylus sensing operations of the touch sensor 500, and processing the signals associated with the stylus. The stylus control circuit 510 may include a front-end circuit 512 and a processor 514. The front-end circuit 512 may be an analog front-end (AFE) circuit, which serves as an interface used for performing signal transmissions and receptions with the touch sensor 500. In various embodiments, the front-end circuit 512 may output the uplink signals to the touch sensing electrodes of the touch sensor 500, so that the touch sensing electrodes may further forward the uplink signals to the stylus. In various embodiments, the front-end circuit 512 may include a receiver 516, and the downlink signals from the stylus received by the touch sensing electrodes may be sent to the stylus control circuit 510 through the receiver 516.

The processor 514 is used to control the operations of the stylus control circuit 510. For example, based on the operation mode, the processor 514 may allocate the time slots to be used for uplink transmissions or downlink transmissions. In an embodiment, the stylus control circuit 510 may be integrated with a touch sensing circuit; hence, the processor 514 may also have touch sensing functions or may be integrated with a touch controller, to allocate the time slots for the touch sensing operations and stylus sensing operations in an appropriate manner. In an embodiment, the processor 514 may be a core processor or controller used for handling various operations of the stylus control circuit 510. Examples of the processor 514 may include, but not limited to, a digital signal processing (DSP) circuit and a microcontroller unit (MCU).

Figure 6:
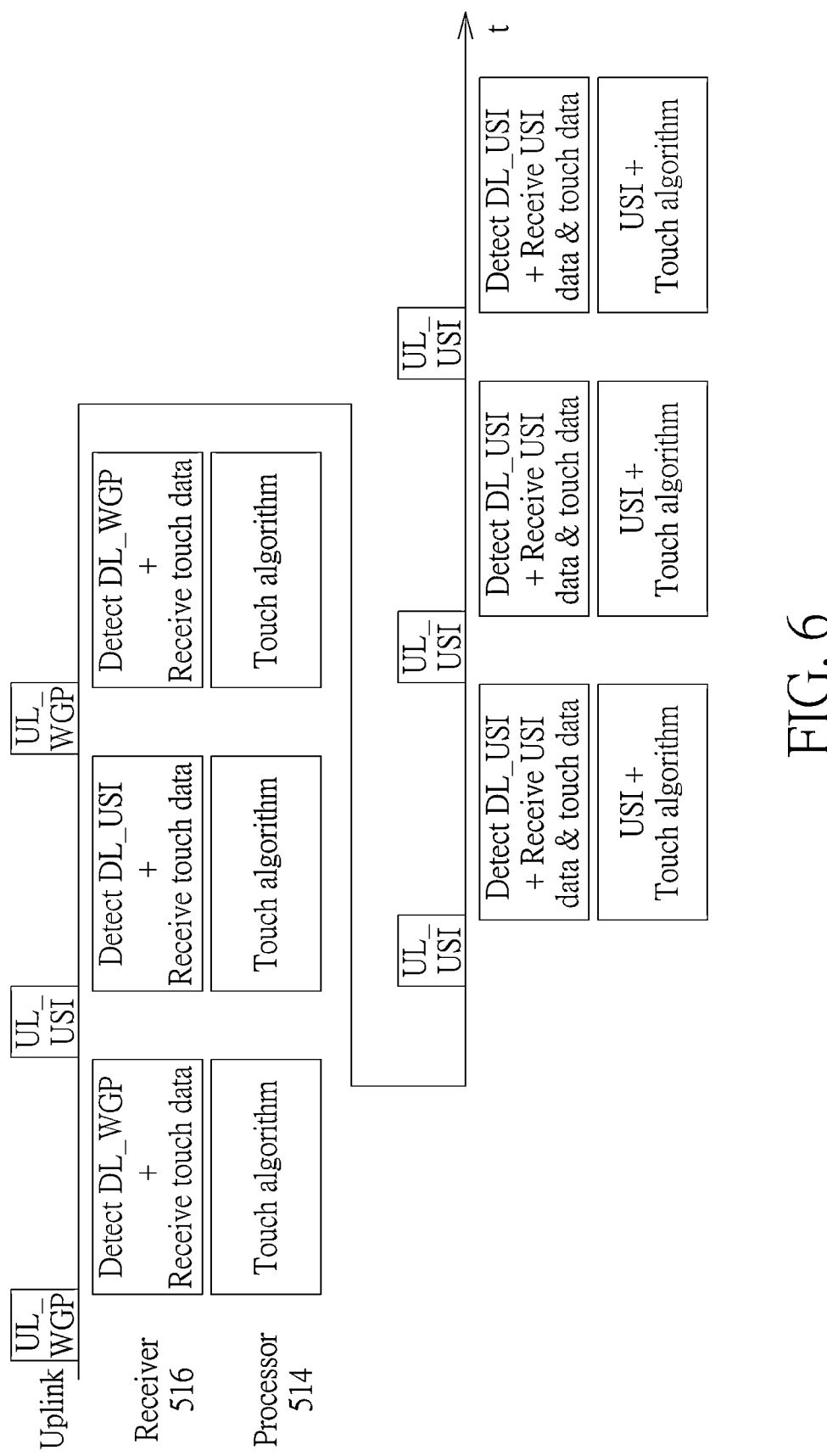
FIG. 6 is a timing diagram of controlling multiple styluses according to an embodiment of the present invention.

FIG. 6 is a timing diagram of controlling multiple styluses according to an embodiment of the present invention. The touch control system may support various types of styluses. In this embodiment, it is assumed that the touch control system supports the styluses of WGP and USI. Therefore, the stylus control circuit 510 may output an uplink signal UL_WGP for the WGP and an uplink signal UL_USI for the USI alternately in a series of time slots. Correspondingly, in the subsequent downlink slots, the receiver 516 may detect a downlink signal DL_WGP of the WGP in response to the uplink signal UL_WGP, or detect a downlink signal DL_USI of the USI protocol in response to the uplink signal UL_USI. As mentioned above, no matter whether the stylus control circuit 510 is operated in the touch mode or the touch and stylus mode, it will also perform touch sensing in several time slots. In such a situation, the receiver 516 may still receive the touch data and the processor 514 may still perform touch sensing algorithms to obtain the related touch information.

Therefore, the stylus control circuit 510 may output different uplink signals UL_WGP and UL_USI alternately until any downlink signal of an active stylus is detected. In this embodiment, the downlink signal DL_USI of the USI protocol is received after the $2^{nd}$ transmission of the uplink signal UL_USI. When detecting the downlink signal DL_USI, the receiver 516 may start to receive the downlink data of the USI stylus in those time slots allocated to stylus detection. Correspondingly, the processor 514 may perform the algorithms corresponding to the USI specification to obtain various sensing information of the USI stylus, which includes, but not limited to, the coordinate and the power level of the stylus. Note that the receiver 516 may still perform touch sensing to receive touch sensing signals and/or data in other time slots allocated to touch detection, and the processor 514 may also perform related algorithms for touch sensing, as shown in FIG. 6.

At this moment, the stylus control circuit 510 knows that a stylus is operating on the touch panel, and communicates with this stylus with the corresponding protocol. Simultaneously, the stylus control circuit 510 may stop outputting the uplink signals for other protocols, to reserve the resources for this stylus. In this embodiment, the stylus control circuit 510 may stop outputting the uplink signal UL_WGP after the USI stylus is detected.

In FIG. 6, each of the uplink transmission block and the downlink transmission block may represent a transmission period including one or more time slots. In an embodiment, one uplink transmission block and one follow-up downlink transmission block may be respectively implemented in the uplink slot and the downlink slots in a frame period, but the implementation of the present invention is not limited herein. For example, in another embodiment, two or more uplink transmission blocks and the follow-up downlink transmission blocks may correspond to multiple time slots in the same frame period.

Figure 7:
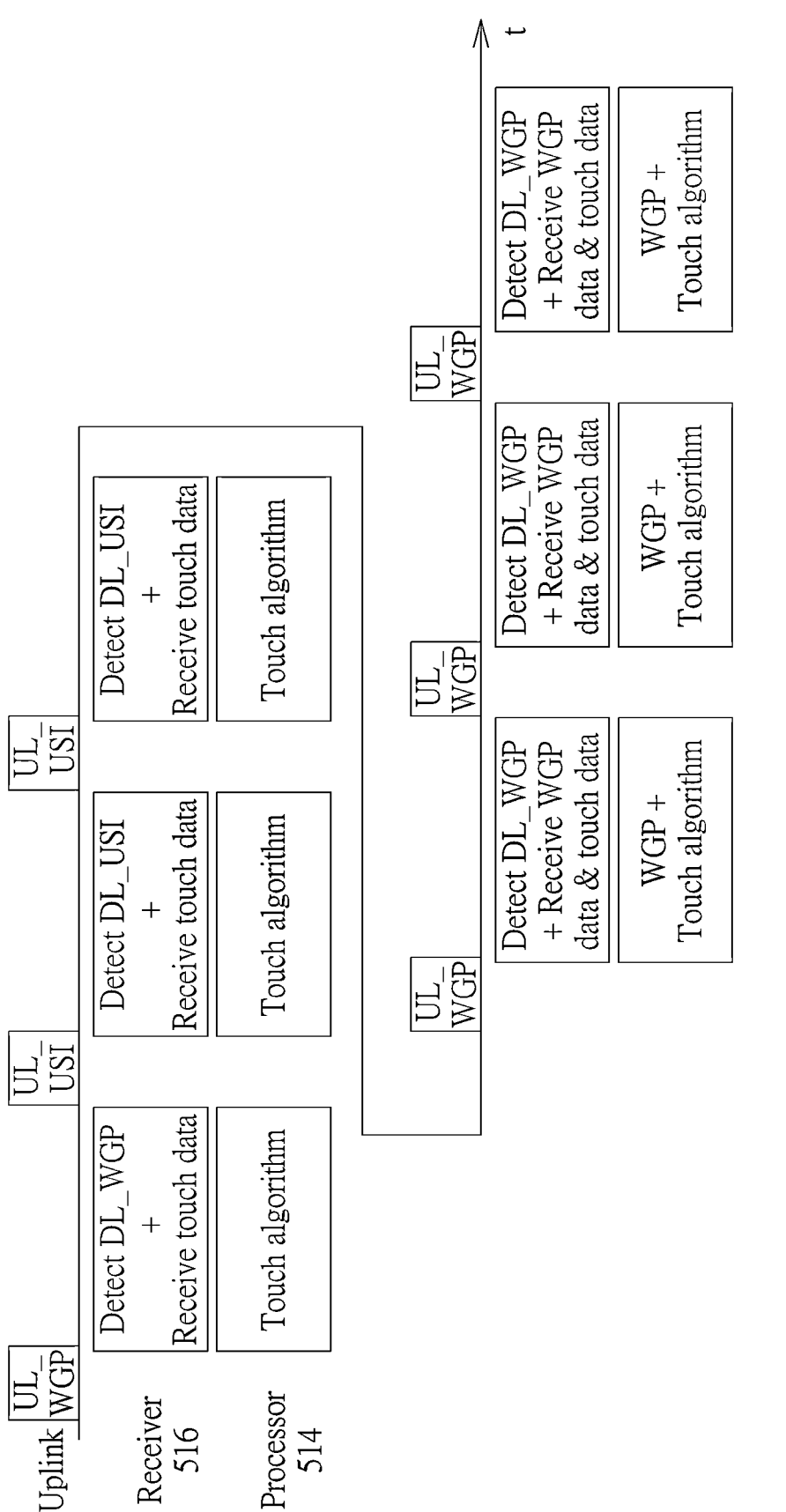
FIG. 7 is another timing diagram of controlling multiple styluses according to an embodiment of the present invention.

Note that the embodiment shown in FIG. 6 is only one of various implementations of timing allocation for stylus control. In other embodiments, the timing may be allocated differently. FIG. 7 is another timing diagram of controlling multiple styluses according to an embodiment of the present invention. Before any active stylus is detected, the uplink signals for different protocols may be output alternately in any appropriate manners. For example, the stylus control circuit 510 may output the uplink signal corresponding to the first type of stylus by more times than the uplink signal corresponding to the second type of stylus. In an exemplary embodiment, the stylus control circuit 510 may determine that the first type of stylus is used by the user more frequently, and thereby allocate more time slots to the first type of stylus during the stylus detection operations.

As shown in FIG. 7, the stylus control circuit 510 alternately outputs the uplink signal UL_WGP once and outputs the uplink signal UL_USI twice until any downlink signal of an active stylus is detected. In this embodiment, the downlink signal DL_WGP of the WGP is detected in response to a transmission of the uplink signal UL_WGP. When detecting the downlink signal DL_WGP, the receiver 516 may start to receive the downlink data of the WGP stylus in those time slots allocated to stylus detection. Correspondingly, the processor 514 may perform the algorithms corresponding to the WGP to obtain various sensing information of the WGP stylus. The operations associated with touch sensing are similar to those described in the above paragraphs, and will not be detailed herein. At this moment, the stylus control circuit 510 may stop outputting the uplink signal UL_USI corresponding to the USI protocol.

Figure 8:
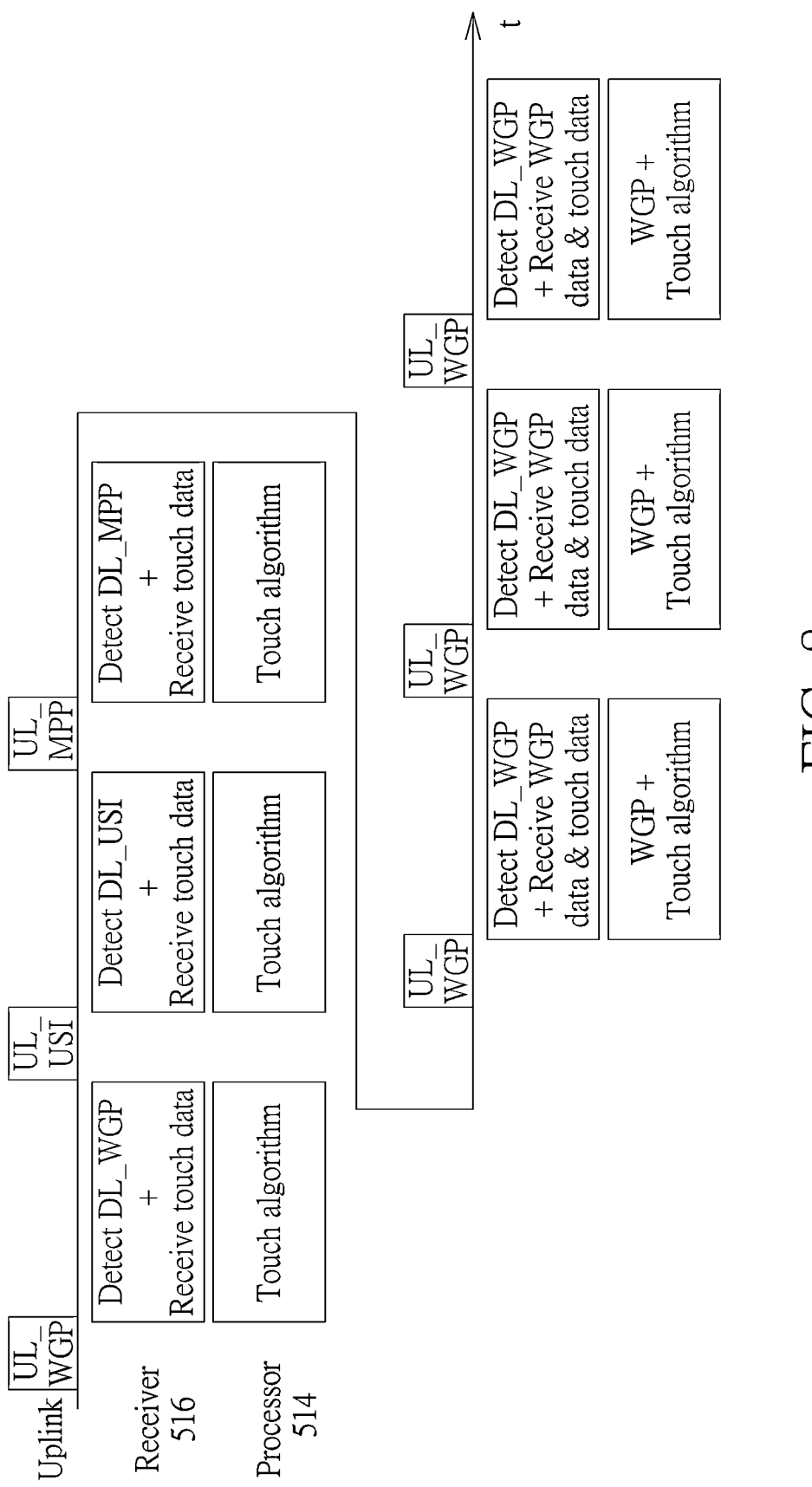
FIG. 8 is a further timing diagram of controlling multiple styluses according to an embodiment of the present invention.

In another embodiment, the touch control system may support more than 2 protocols. For example, FIG. 8 is a further timing diagram of controlling multiple styluses according to an embodiment of the present invention. In this embodiment, the touch control system and the related stylus control circuit 510 support 3 protocols: WGP, USI and MPP. Therefore, before any active stylus is detected, the uplink signal UL_WGP for the WGP, the uplink signal UL_USI for the USI, and the uplink signal UL_MPP for the MPP are alternately output. The receiver 516 then performs the corresponding detection on the downlink signals DL_WGP, DL_USI and DL_MPP in the corresponding downlink slots, respectively. After the downlink signal UL_WGP of the WGP is detected, the receiver 516 may start to receive the downlink data of the WGP stylus in those time slots allocated to stylus detection. Correspondingly, the processor 514 may perform the algorithms corresponding to the WGP to obtain various sensing information of the WGP stylus. The operations associated with touch sensing are similar to those described in the above paragraphs, and will not be detailed herein. At this moment, the stylus control circuit 510 may stop outputting the uplink signals UL_USI and UL_MPP.

In another embodiment, the stylus control circuit 510 may receive a setting signal, and perform uplink transmissions for stylus detection according to the setting signal. For example, the setting signal may indicate that a specific type of stylus with a specific protocol is requested to be used. Therefore, the stylus control circuit 510 may output only the uplink signal corresponding to this specific type of stylus after receiving the setting signal. For example, the uplink transmission of the stylus control circuit 510 may be determined by the user; that is, the user may know that he/she is using a specific type of stylus to operate the touch panel and select the corresponding protocol accordingly. In such a situation, a command associated with the user setting may be provided to the stylus control circuit 510; hence, the stylus control circuit 510 will output the uplink signal for the protocol selected by the user. By using the user-specified setting signal, the user is able to rapidly control the stylus control circuit 510 to be switched to an operation mode corresponding to the selected protocol, thereby decreasing the entrance latency. For example, when the stylus control circuit 510 supports a great number of protocols, it may require a long time to try to communicate with different types of styluses by outputting different uplink signals in a series of frame periods. If the setting signal is used, the stylus control circuit 510 will rapidly determine the protocol and start to perform communications with the stylus.

Figure 9:
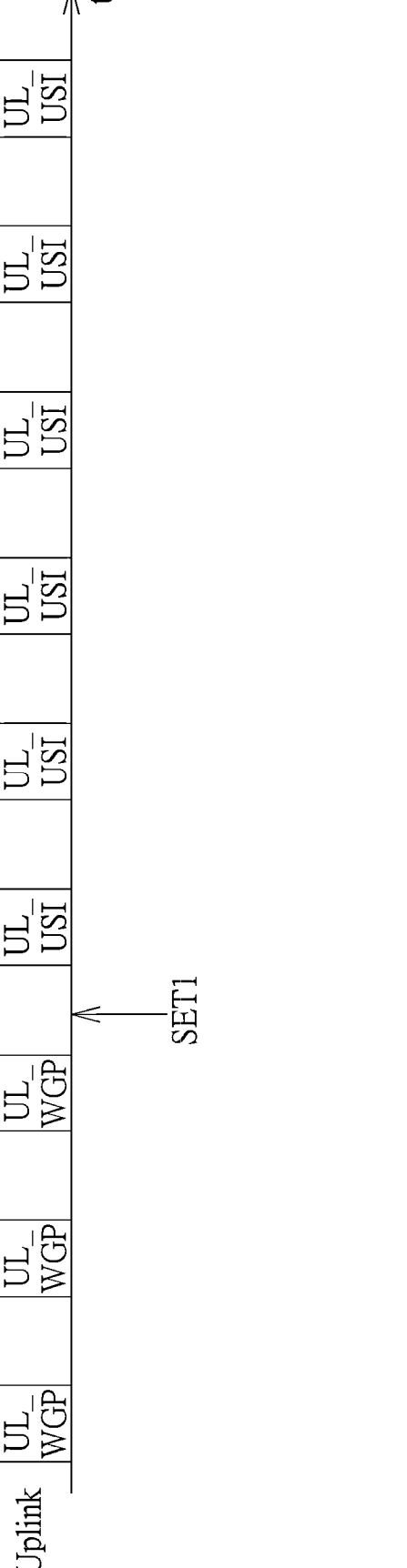
FIG. 9 is a timing diagram of controlling multiple styluses according to the setting signal.

FIG. 9 is a timing diagram of controlling multiple styluses according to the setting signal. To facilitate the illustrations, only the uplink signals output by the stylus control circuit 510 are shown in FIG. 9, where the corresponding downlink signals are omitted. In this embodiment, the stylus control circuit 510 may continuously output the uplink signal UL_WGP for the WGP originally. After receiving a setting signal SET1 indicating that the user needs to use a USI stylus, the stylus control circuit 510 may change to output the uplink signal UL_USI for the USI protocol.

In an embodiment, the stylus control circuit 510 may further provide a foolproof function. For example, if the setting signal indicates that a first type of stylus with a protocol is used, the stylus control circuit 510 may continuously output only the uplink signal corresponding to the first type of stylus. Subsequently, after not receiving a downlink signal corresponding to the first type of stylus for a specific period of time, the stylus control circuit 510 may change to output the uplink signal corresponding to a second type of stylus with another protocol.

Figure 10:
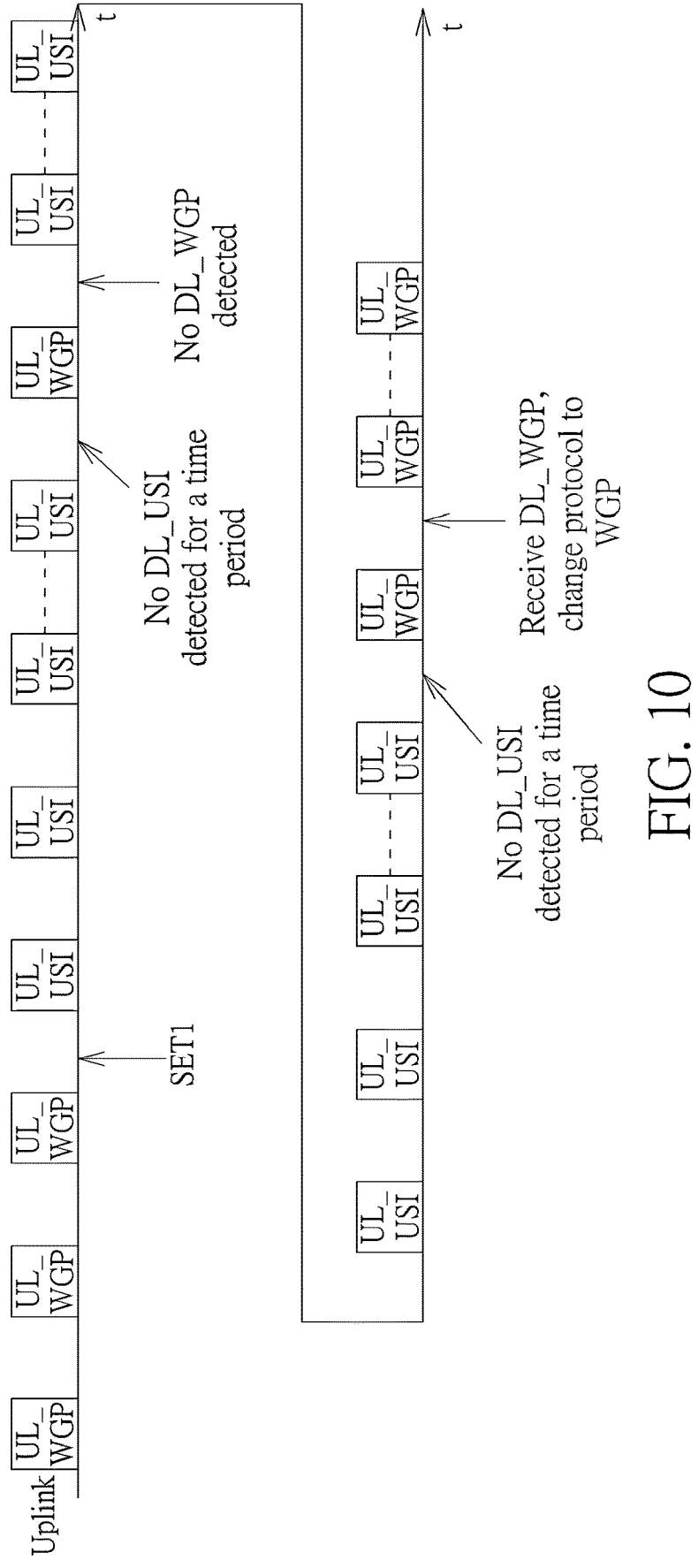
FIG. 10 is a timing diagram of controlling multiple styluses according to the setting signal with a foolproof function.

FIG. 10 is a timing diagram of controlling multiple styluses according to the setting signal with a foolproof function. Similarly, only the uplink signals output by the stylus control circuit 510 are shown in FIG. 10. Based on the foolproof function, the stylus control circuit 510 may determine whether the setting signal is correctly provided with appropriate outputs of the uplink signals.

In this embodiment, the stylus control circuit 510 may continuously output the uplink signal UL_WGP for the WGP originally. After receiving a setting signal SET1 indicating that the user needs to use a USI stylus, the stylus control circuit 510 may change to output the uplink signal UL_USI for the USI protocol. Subsequently, since no downlink signal DL_USI of the USI protocol is detected for a predetermined period of time, the stylus control circuit 510 returns to output the uplink signal UL_WGP. Since there is no downlink signal DL_WGP detected, the stylus control circuit 510 then changes to output the uplink signal UL_USI indicated by the setting signal SET1 again. Subsequently, there is still no downlink signal DL_USI detected for a predetermined period of time, the stylus control circuit 510 then returns to output the uplink signal UL_WGP again. At this time, a downlink signal DL_WGP is received in response to the uplink signal UL_WGP, which means that a WGP stylus is detected. The touch control system thereby changes the user-select protocol to be the WGP, and the stylus control circuit 510 continuously outputs only the uplink signal UL_WGP and receives the corresponding downlink signal DL_WGP.

In an embodiment, the touch panel may be operated by using multiple styluses at the same time. Therefore, the stylus control circuit 510 may detect multiple styluses with different protocols simultaneously. In such a situation, the stylus control circuit 510 may still alternately output multiple uplink signals corresponding to the detected styluses.

Figure 11:
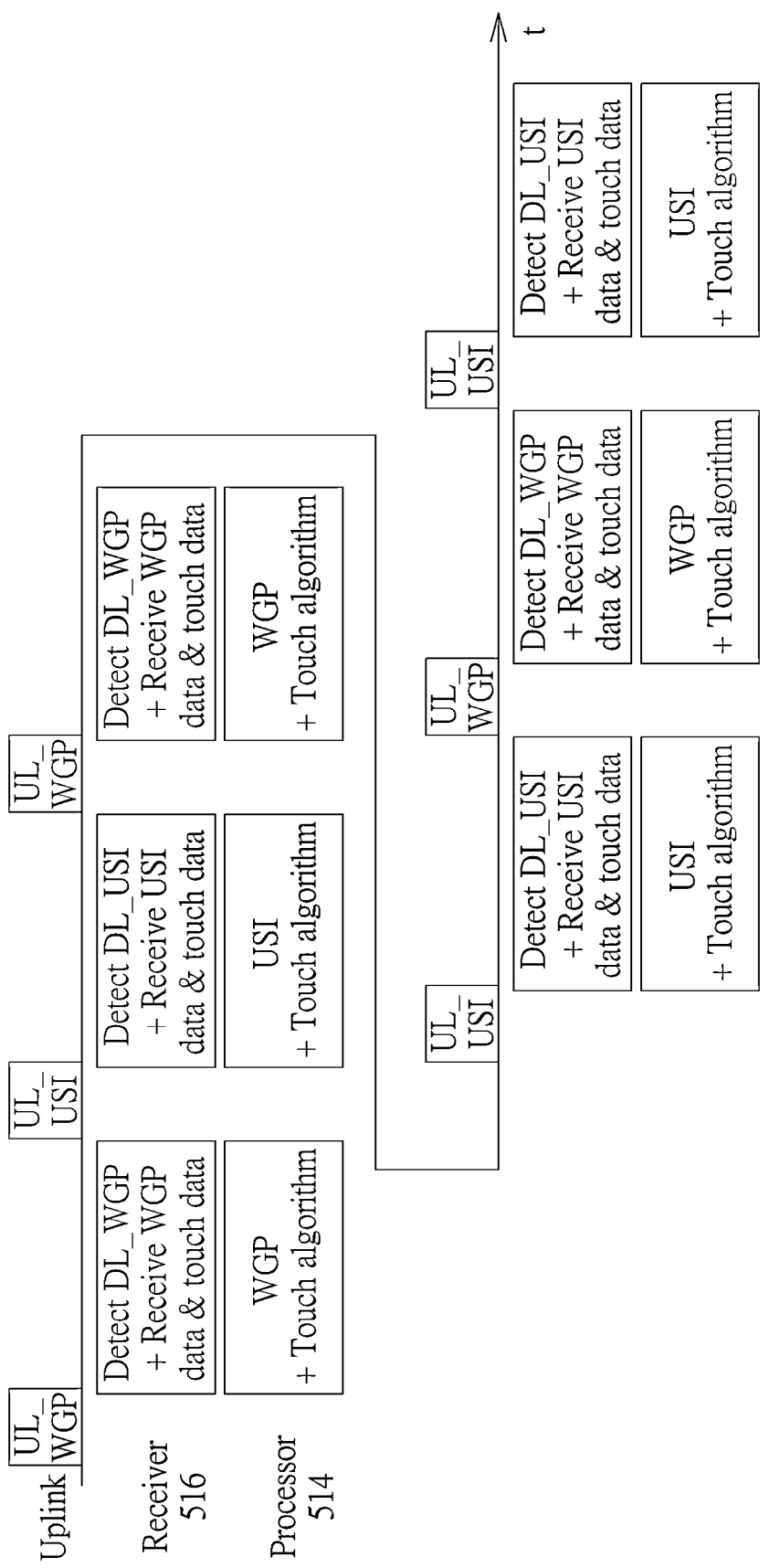
FIG. 11 is a timing diagram of controlling different types of styluses simultaneously operated on the touch panel according to an embodiment of the present invention.

A related embodiment is shown in FIG. 11, where the stylus control circuit 510 detects both a WGP stylus and a USI stylus. Therefore, the stylus control circuit 510 may output the uplink signal UL_WGP for the WGP and the uplink signal UL_USI for the USI protocol alternately. In response to the uplink signal UL_WGP, the receiver 516 may receive the downlink signal DL_WGP of the WGP and the related stylus data, and the processor 514 may perform the algorithms corresponding to the WGP to obtain various sensing information of the WGP stylus. In response to the uplink signal UL_USI, the receiver 516 may receive the downlink signal DL_USI of the USI protocol and the related stylus data, and the processor 514 may perform the algorithms corresponding to the USI protocol to obtain various sensing information of the USI stylus. At this moment, the receiver 516 may also perform touch sensing to receive touch sensing signals and/or data in other time slots allocated to touch detection, and the processor 514 may also perform touch sensing algorithms to obtain the related touch information.

As mentioned above, the touch control system of the present invention may support a unidirectional stylus that outputs downlink signal(s) in a predetermined frequency. The unidirectional stylus may not receive any uplink signal from the touch control system, but continuously output downlink signal(s) in one or more frequencies. For example, a unidirectional stylus may continuously output a downlink signal in a frequency such as 485 kHz. Without the usage of the uplink signal, the stylus control circuit is able to obtain the information of the unidirectional stylus by receiving the downlink signal on the frequency of 485 kHz, e.g., detecting the energies appearing on 485 kHz. An easy pen is one of the common unidirectional styluses, and is capable of outputting a downlink signal (e.g., a single-tone signal) in a predetermined frequency. In the following paragraphs, the easy pen is taken as an example for describing the operations of the unidirectional stylus, and a skilled person would know that the easy pen described hereinafter may refer to any type of unidirectional stylus.

In an embodiment, the stylus control circuit 510 may be originally in the touch mode, to have several downlink slots used to perform touch sensing or stylus sensing or noise detection, such as the downlink slots TS0-TS19 shown in FIG. 1. As for a touch control system supporting an easy pen, the easy pen detection may be performed in any of these downlink slots. In other words, at least one of the downlink slots may be used to detect an easy pen in one or several designated frequencies, which may be the frequencies that the downlink signal output by an easy pen is possibly in. In various embodiments, one or several frequencies or frequency bands may be predetermined, so that the stylus control circuit 510 may perform easy pen detection on these frequencies or frequency bands.

Therefore, the stylus control circuit 510 needs not to output any uplink signal for the easy pen detection. If a signal in a specific frequency is detected (or the signal strength detected in a specific frequency is greater than a predetermined threshold), the stylus control circuit 510 may determine that there may be an easy pen approaching or contacting the touch panel. At this moment, the touch control system may be switched to the touch and stylus mode, to allocate more time slots for receiving downlink signals from the easy pen. Based on the downlink signals received from the easy pen (e.g., received by which touch sensing electrode(s)), the stylus control circuit 510 may determine various sensing information of the easy pen, such as the easy pen's coordinate.

Figure 12:
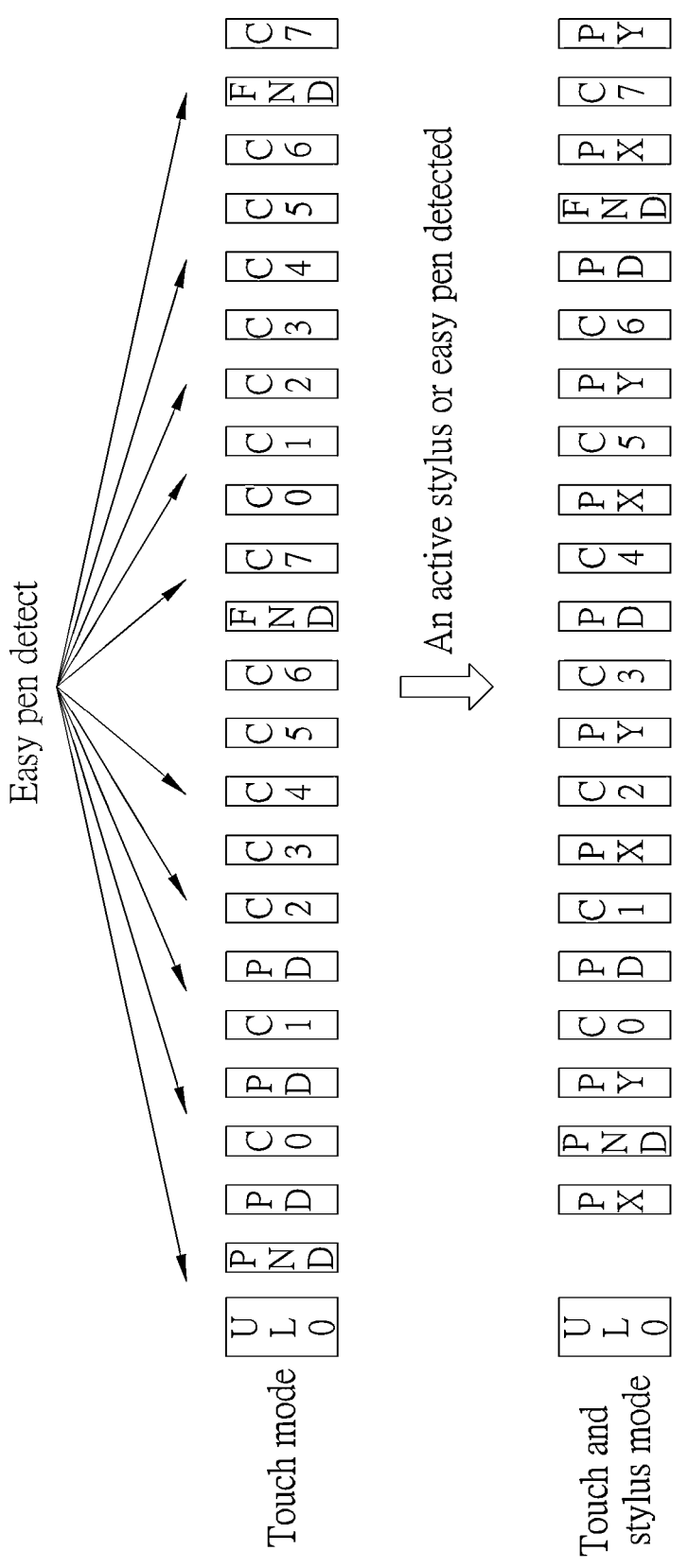
FIG. 12 illustrates that the easy pen detection may be performed in any downlink slots.

FIG. 12 illustrates that the easy pen detection may be performed in any downlink slots. As shown in FIG. 12, the touch control system may be originally operated in the touch mode, where the time slots for touch and stylus sensing may include an uplink slot UL0 and multiple downlink slots PND, PD, FND and C0-C7 for different uses. PND refers to noise detection for a stylus. PD refers to the detection of the existence of a stylus. FND refers to noise detection for finger touch. C0-C7 refers to touch sensing performed by scanning various columns of touch sensing electrodes. The downlink slot allocations shown in FIG. 12 may follow the specification of USI. Based on the specification, the stylus control circuit 510 may detect the downlink signals of a USI stylus in the time slots PD. Since the easy pen continuously outputs downlink signals without considering the uplink signal, the downlink signals may appear in any time slots; hence, the stylus control circuit 510 may detect the downlink signals of the easy pen in any downlink slots.

In an embodiment, it is assumed that the hardware of the stylus control circuit 510 is capable of detecting signals in 4 different frequencies at the same time. Therefore, when the easy pen detection is performed in the downlink slot PND or FND which is originally used for noise detection, the detection will be performed not only on the noises in specific frequencies, but also on the signals of an easy pen in the same or different frequencies.

When the easy pen detection is performed in the downlink slot PD for stylus detection, the detection will be to find not only the active stylus with a specific protocol (e.g., based on the information provided in the uplink signal), but also the easy pen (e.g., in several predetermined frequencies). For example, if the touch control system supports a USI stylus and an easy pen, which may correspond to different frequencies, the stylus control circuit 510 will perform demodulation using a first frequency to receive the acknowledge signals and/or downlink data of the USI stylus, and also perform demodulation using a second frequency to receive the downlink signal of the easy pen.

When the easy pen detection is performed in the downlink slots C0-C7 for touch sensing, the stylus control circuit 510 may perform demodulation using one or more frequency(s) that the easy pen is predicted to be in, in addition to the frequency of finger touch signals. As mentioned above, the stylus control circuit 510 may be capable of detecting 4 frequencies, which means that it may perform demodulation using 4 different frequencies simultaneously; hence, one of these 4 frequencies may be used to detect the finger touch signals, and the other 3 frequencies may be used to detect the easy pen.

As shown in FIG. 12, after a USI stylus or an easy pen is detected, the touch control system may enter the touch and stylus mode, where the downlink slots may be allocated to include PND, PD, FND, PX, PY and C0-C7. The operations of the downlink slots PND, PD, FND and C0-C7 are identical to those in the touch mode. The additional downlink slots PX and PY in the touch and stylus mode are used for coordinate detections and calculations of the detected USI stylus or easy pen.

Figure 13:
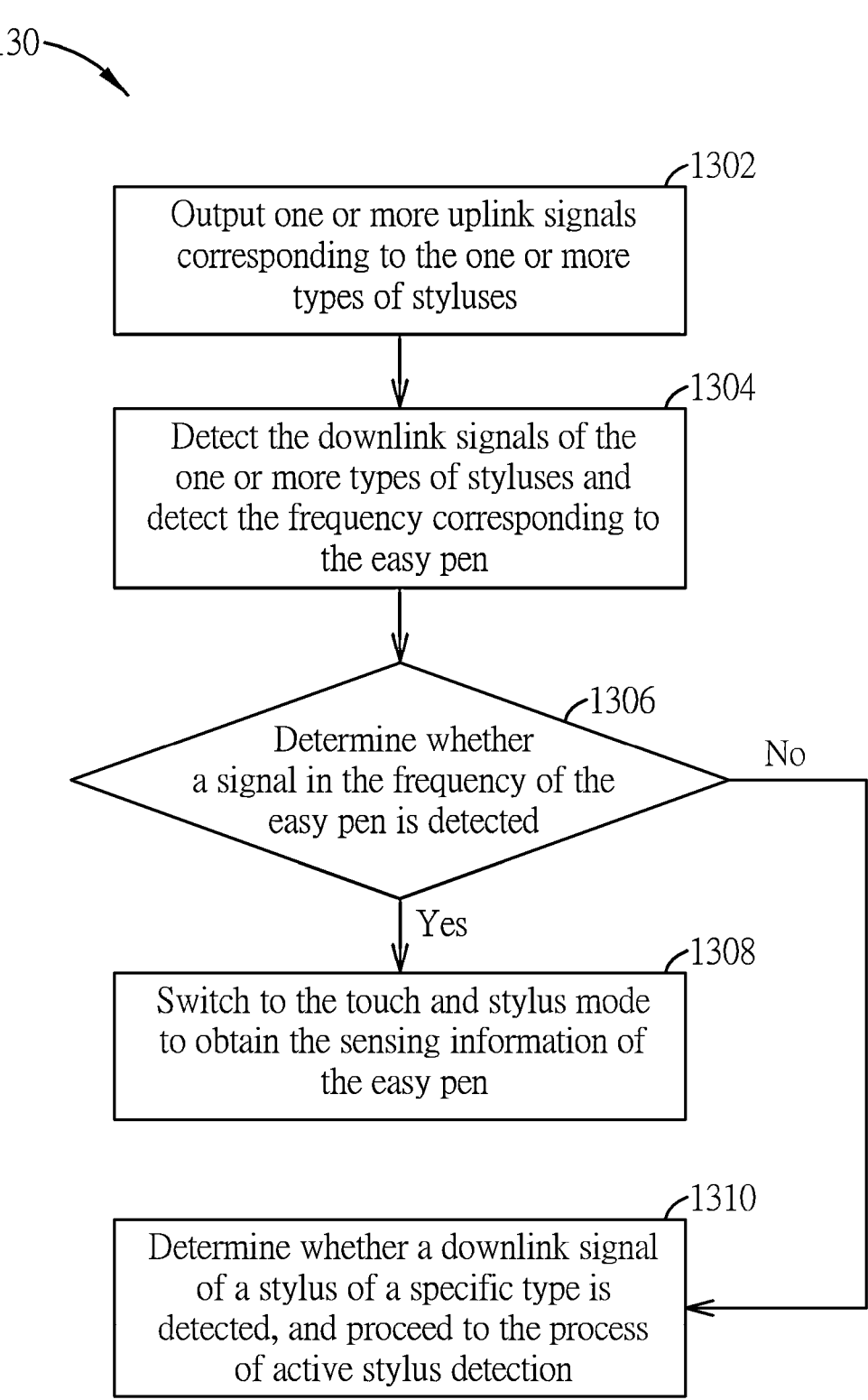
FIG. 13 is a flowchart of a process according to an embodiment of the present invention.

FIG. 13 is a flowchart of a process 130 according to an embodiment of the present invention. The process 130 specifies the operations of a stylus control circuit such as the stylus control circuit 510 of FIG. 5, to control a plurality of types of styluses including one or more types of active styluses (i.e., active stylus(s) with protocol(s)) and an easy pen (which may be deemed as another type of stylus). As shown in FIG. 13, the process 130 includes the following steps:

Step 1302: Output one or more uplink signals corresponding to the one or more types of styluses.

Step 1304: Detect the downlink signals of the one or more types of styluses and detect the frequency corresponding to the easy pen.

Step 1306: Determine whether a signal in the frequency of the easy pen is detected. If yes, go to Step 1308; otherwise, go to Step 1310.

Step 1308: Switch to the touch and stylus mode to obtain the sensing information of the easy pen.

Step 1310: Determine whether a downlink signal of a stylus of a specific type is detected, and proceed to the process of active stylus detection.

According to the process 130, the stylus control circuit 510 may continuously output one or more uplink signals corresponding to the one or more types of styluses (Step 1302). Based on the corresponding uplink signal(s), the stylus control circuit 510 may detect the styluses by detecting the downlink signals in the time slots specified by the corresponding protocol. For example, if the touch control system supports the USI protocol, the stylus control circuit 510 may output an uplink signal of the USI protocol and detect the corresponding downlink signal in the downlink slot PD as shown in FIG. 12.

Besides, the stylus control circuit 510 may detect the frequency(s) corresponding to the easy pen (Step 1304). More specifically, the stylus control circuit 510 may detect the easy pen by detecting a downlink signal corresponding to the easy pen in one or more designated frequencies. As mentioned above, the stylus control circuit 510 may support multi-frequency detection at the same time; hence, one or more frequencies for the easy pen and one or more frequencies for the active stylus may be detected simultaneously, where the frequency(s) of the easy pen may be different from the frequency(s) of the active stylus.

If there is a signal received in one frequency of the easy pen (or the signal strength detected in one frequency of the easy pen is greater than a predetermined threshold), the touch control system may enter the touch and stylus mode, to further obtain various sensing information of the easy pen (Step 1306). In such a situation, the stylus control circuit 510 may start to communicate with the easy pen according to the frequency of the detected easy pen. For example, in the touch and stylus mode, the stylus control circuit 510 may continuously perform demodulation on the received signals by using the frequency of this easy pen in the time slots allocated to stylus sensing, such as PX, PY and PD shown in FIG. 12.

In the process 130, the stylus control circuit 510 may further determine whether a downlink signal of the active stylus with a specific protocol is detected, and proceed to the process of active stylus detection, such as the process 40 shown in FIG. 4. In other words, the processes 130 and 40 may be combined in an appropriate manner to realize both the easy pen detection and active stylus detection. In the active stylus detection, for example, the stylus control circuit 510 may alternately output uplink signals for different types of styluses. After a downlink signal corresponding to the first type of stylus is detected, the stylus control circuit 510 may start to communicate with the detected stylus with the protocol corresponding to the first type of stylus.

In the process 130, determination of the signal of the easy pen is performed in Step 1306, and determination of the downlink signal of the active stylus is performed in Step 1310. In an embodiment, Step 1306 is performed before Step 1310, but those skilled in the art would know that the implementation is not limited thereto. In another embodiment, the detection or determination of the easy pen may be integrated with the detection or determination of the active stylus, which means that these detections may be performed simultaneously.

In addition, the timeout scheme of the process 40 may also be incorporated. For example, during the communications with an easy pen using a first frequency, if the stylus control circuit 510 fails to receive the downlink signal in the first frequency for a specific period of time, it will restart to perform detection on another easy pen and/or active stylus in other frequencies.

Figure 14:
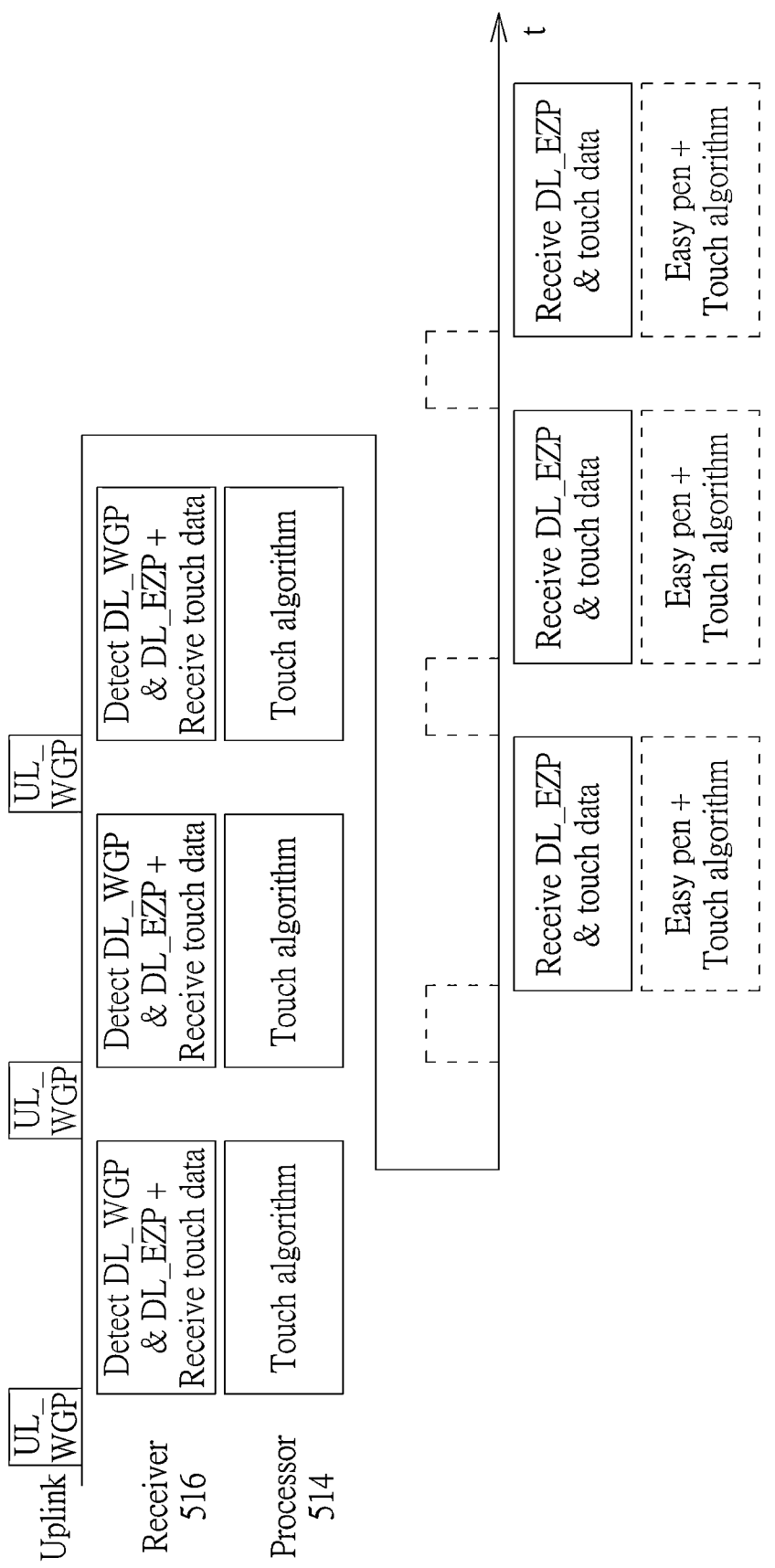
FIG. 14 is a timing diagram of controlling active stylus(s) and easy pen(s) according to an embodiment of the present invention.

FIG. 14 is a timing diagram of controlling active stylus(s) and easy pen(s) according to an embodiment of the present invention. Assuming that the touch control system supports various types of styluses, including a WGP stylus and an easy pen, the stylus control circuit 510 may output an uplink signal UL_WGP for the WGP in each uplink slot, and correspondingly detect a downlink signal DL_WGP of the WGP in the subsequent downlink slot. More specifically, the receiver 516 may detect the downlink signal DL_WGP in response to the uplink signal UL_WGP. As mentioned above, no matter whether the stylus control circuit 510 is operated in the touch mode or the touch and stylus mode, it will also perform touch sensing in several time slots. In such a situation, the receiver 516 may still receive the touch data and the processor 514 may still perform touch sensing algorithms to obtain the related touch information.

In this embodiment, the touch control system may also support an easy pen; hence, the receiver 516 may further detect a downlink signal DL_EZP of the easy pen, e.g., detect a specific frequency that the downlink signal DL_EZP of the easy pen may be in. Therefore, in addition to detecting the downlink signal DL_WGP, the receiver 516 may also detect the downlink signal DL_EZP output by the easy pen. In an embodiment, the downlink signals DL_WGP and DL_EZP may be detected in the same time slot(s), where one or more time slots allocated to active stylus detection may also be used for easy pen detection. Alternatively, the downlink signals DL_WGP and DL_EZP may be detected in different time slots; that is, the downlink signal DL_EZP of the easy pen may be detected in the downlink slots for noise detection or touch sensing, as the implementations illustrated in FIG. 12.

Therefore, the stylus control circuit 510 may output the uplink signal UL_WGP and perform detection on the WGP stylus and the easy pen until any downlink signal is received. In this embodiment, the downlink signal DL_EZP of the easy pen is received after the $3^{rd}$ transmission of the uplink signal UL_WGP. After the downlink signal DL_EZP is detected, the stylus control circuit 510 may start to communicate with the easy pen according to its frequency. More specifically, the receiver 516 may be dedicated to receive the downlink signal DL_EZP in the frequency of the easy pen. Correspondingly, the processor 514 may perform the algorithms corresponding to the easy pen to obtain various sensing information of the easy pen, which includes, but not limited to, the coordinate and the power level of the easy pen. In such a situation, the stylus control circuit 510 may stop outputting the uplink signal UL_WGP for the WGP. Similarly, the receiver 516 may still perform touch sensing to receive touch sensing signals and/or data in the time slots allocated to touch detection, and the processor 514 may also perform related algorithms for touch sensing, as shown in FIG. 14.

Figure 15:
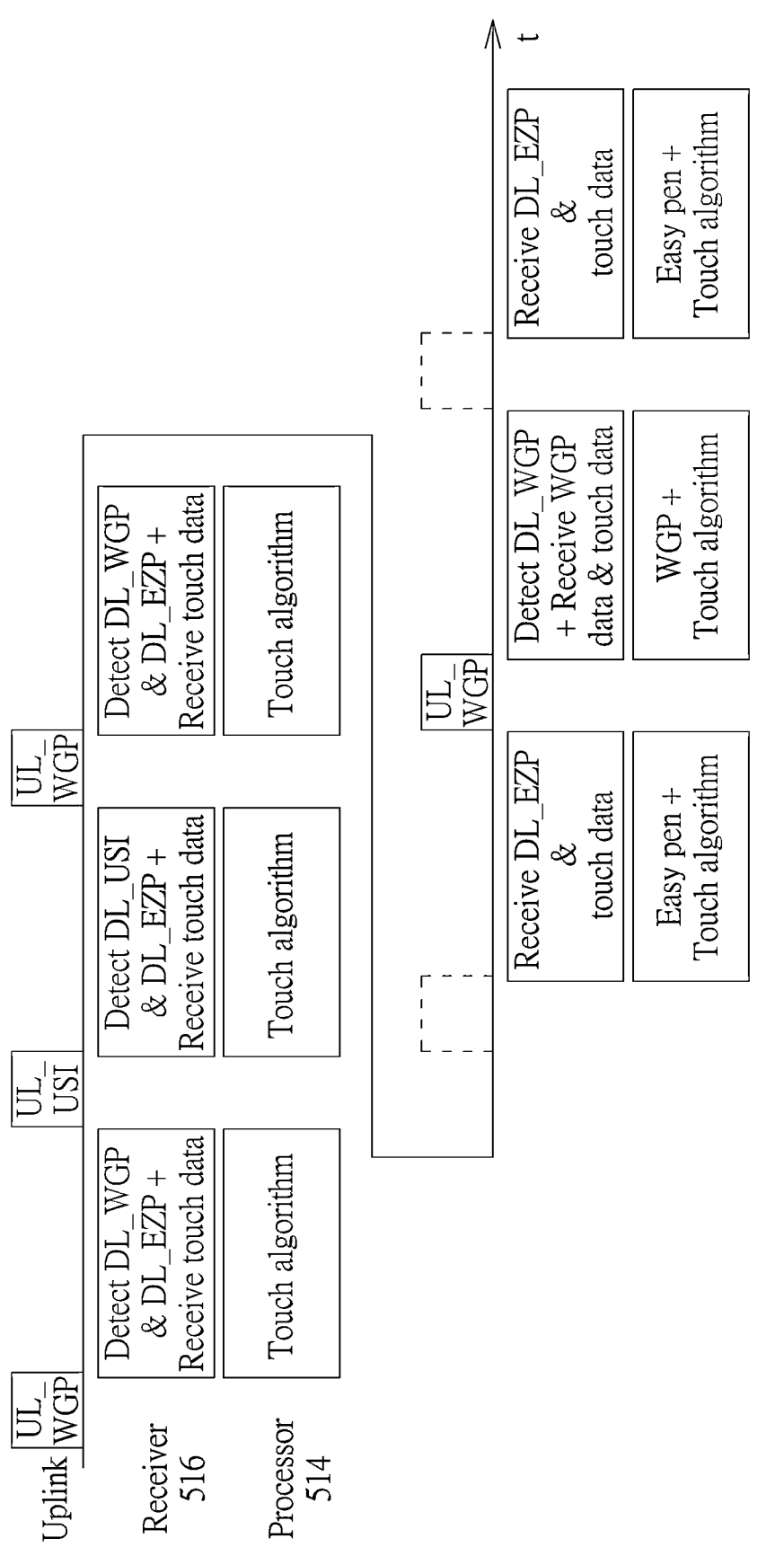
FIG. 15 is a timing diagram of controlling multiple styluses simultaneously operated on the touch panel according to an embodiment of the present invention.

Note that the touch control system of the present invention may also support simultaneous operations of an active stylus and an easy pen. For example, FIG. 15 is a timing diagram of controlling multiple styluses simultaneously operated on the touch panel according to an embodiment of the present invention. In this embodiment, it is assumed that the touch control system supports the styluses of WGP and USI and also supports an easy pen. Therefore, the stylus control circuit 510 may output the uplink signal UL_WGP for the WGP and the uplink signal UL_USI for the USI alternately in the touch mode. Correspondingly, the receiver 516 may detect the WGP stylus by detecting the downlink signal DL_WGP in response to the uplink signal UL_WGP, and also detect the USI stylus by detecting the downlink signal DL_USI in response to the uplink signal UL_USI. In addition, the receiver 516 may also detect the downlink signal DL_EZP of the easy pen. The receiver 516 and the processor 514 may also perform touch sensing operations similar to those described in the above embodiments, which will not be detailed herein for brevity.

In this embodiment, the stylus control circuit 510 may detect that there are a WGP stylus and an easy pen simultaneously operated on the touch panel. In such a situation, the stylus control circuit 510 may detect and receive the downlink signals DL_WGP and DL_EZP alternately in the subsequent time slots. For example, in response to the transmission of the uplink signal UL_WGP, the receiver 516 may start to receive the downlink data of the WGP stylus, and the processor 514 may perform the algorithms corresponding to the WGP to obtain various sensing information of the WGP stylus. In addition, in the downlink slots following the uplink slot originally allocated to the USI stylus detection, the receiver 516 may communicate with the easy pen by receiving the downlink signal DL_EZP in its frequency, and the processor 514 may perform the operations corresponding to the easy pen to obtain various sensing information of the easy pen, e.g., performing demodulation using the frequency of the easy pen to obtain the related data and/or information.

Figure 16:
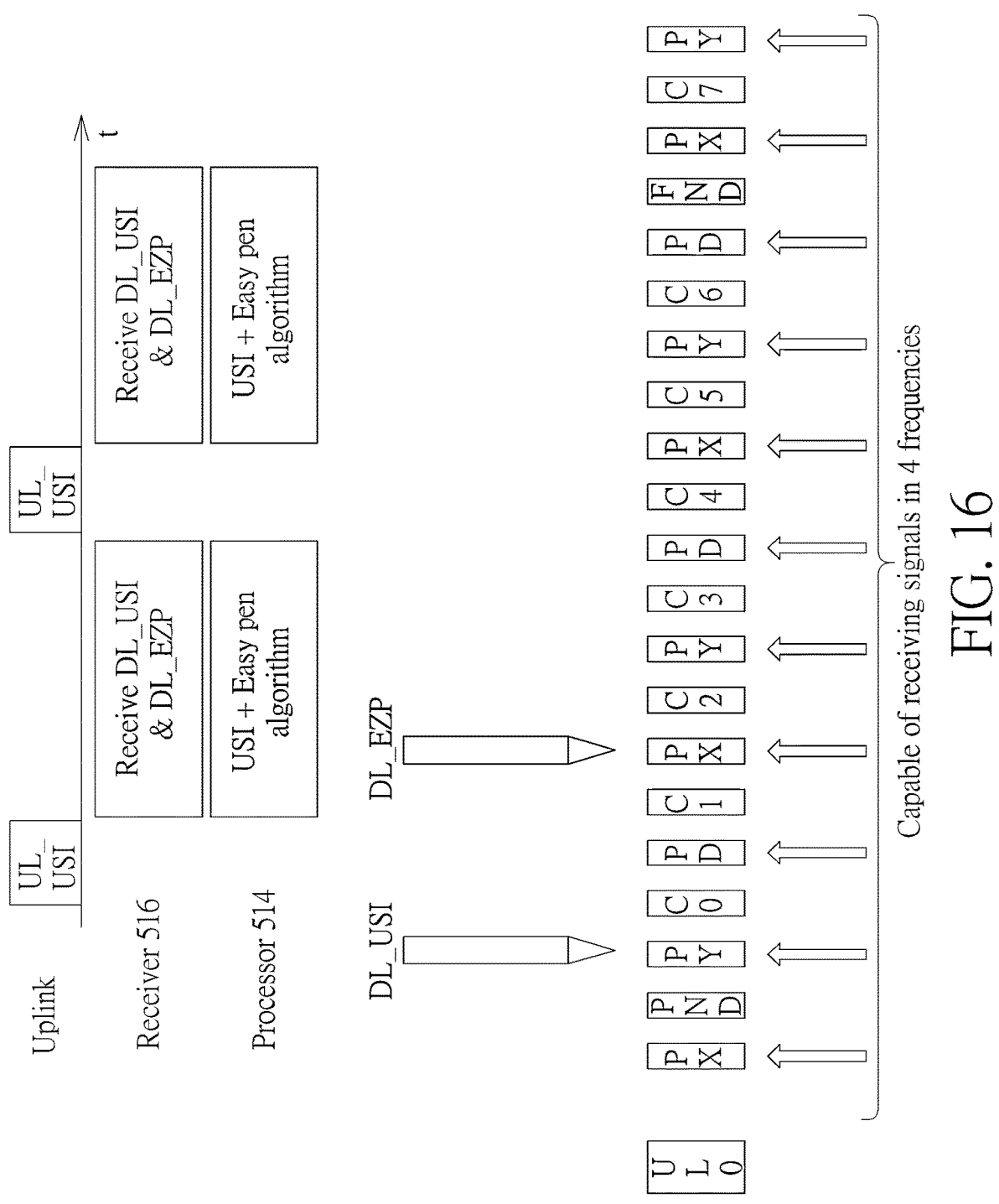
FIG. 16 to FIG. 18 are timing diagrams of controlling an active stylus and one or more easy pens simultaneously operated on the touch panel according to embodiments of the present invention.

In the above embodiment, the stylus control circuit 510 may communicate with the WGP stylus and the easy pen in different frame periods having different uplink slots. In another embodiment with simultaneous operations of an active stylus and an easy pen, the downlink signals of these two styluses may be received in the same frame period. For example, as shown in FIG. 16, there are a USI stylus and an easy pen simultaneously operated on the touch panel. In such a situation, the stylus control circuit 510 may output the uplink signal UL_USI to the USI stylus. The receiver 516 may receive the downlink signal DL_USI in the follow-up downlink slots, and may also receive the downlink signal DL_EZP of the easy pen in the same or different time slots. Correspondingly, the processor 514 may perform corresponding algorithms to obtain various sensing information of the USI stylus and the easy pen. Similarly, the receiver 516 may also receive the touch data, and the processor 514 may perform the touch sensing algorithms accordingly. These operations may be performed in those time slots allocated to touch detection, and are omitted in FIG. 16 for brevity.

In this embodiment, the downlink slots PX, PY and PD which are used for stylus detection may be applied to receive the downlink signals of various styluses. For example, if the stylus control circuit 510 is capable of performing detection and receiving related downlink signals in 4 frequencies, one of these 4 frequencies may be used for the USI stylus, and another one may be used for the easy pen. Each of the downlink signals DL_USI and DL_EZP may be detected in any of the downlink slots PX, PY and PD, and these two downlink signals may be detected and received in the same or different time slots.

Figure 17:
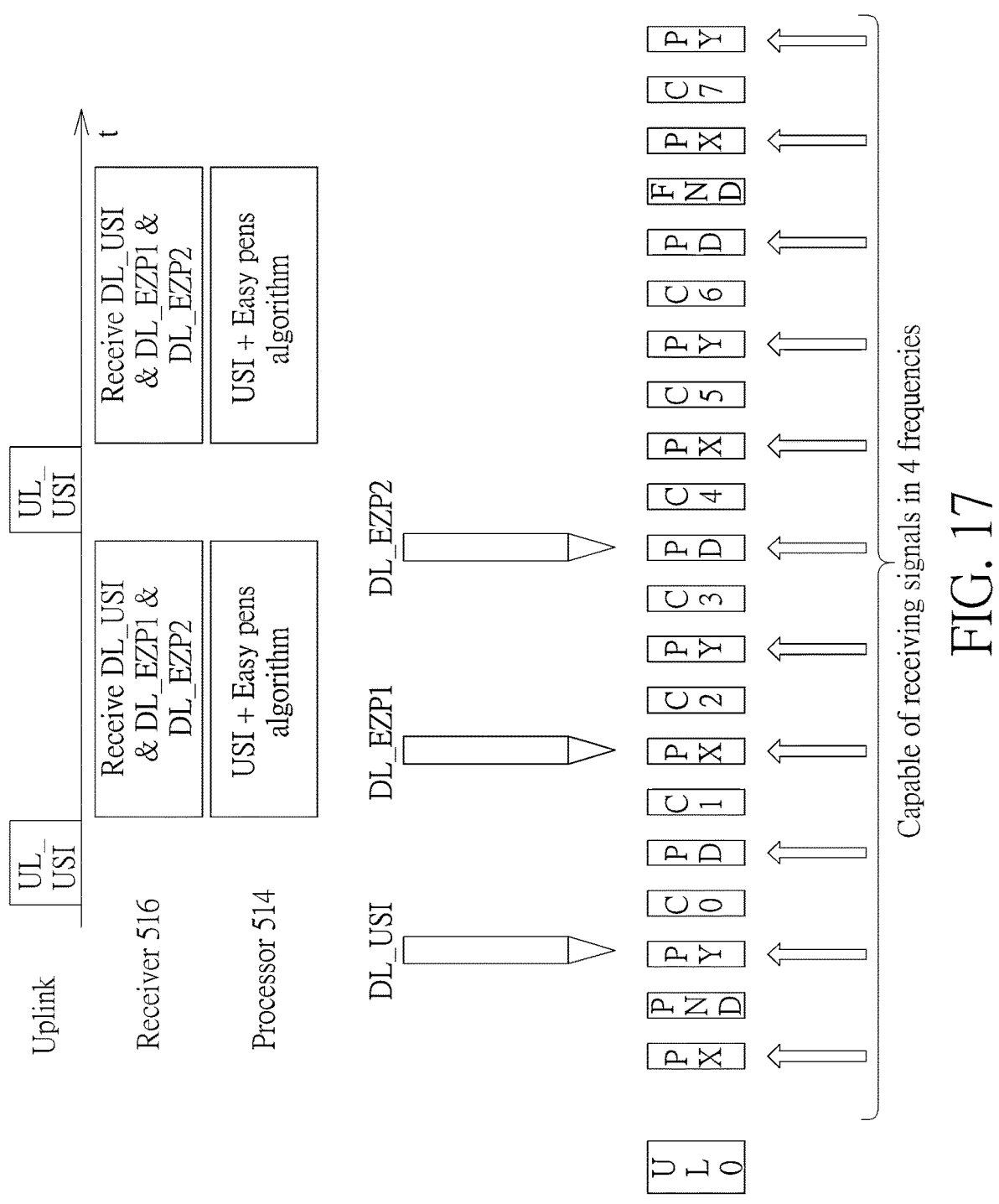

In a similar manner, if the stylus control circuit 510 has the capability of detecting 4 different frequencies, the related touch control system may support at most 4 different types of styluses, which may include more than 2 easy pens of different types which are operated in different frequencies. For example, as shown in FIG. 17, in addition to the USI stylus and the first easy pen (which outputs a downlink signal DL_EZP1 in a first frequency such as 485 kHz), the stylus control circuit 510 may also detect a second easy pen by detecting another downlink signal DL_EZP2 in a second frequency such as 285 kHz, which may be different from the first frequency. Similarly, each of the downlink signals DL_USI, DL_EZP1 and DL_EZP2 may be detected and received in the same or different time slots among those downlink slots PX, PY and PD.

Figure 18:
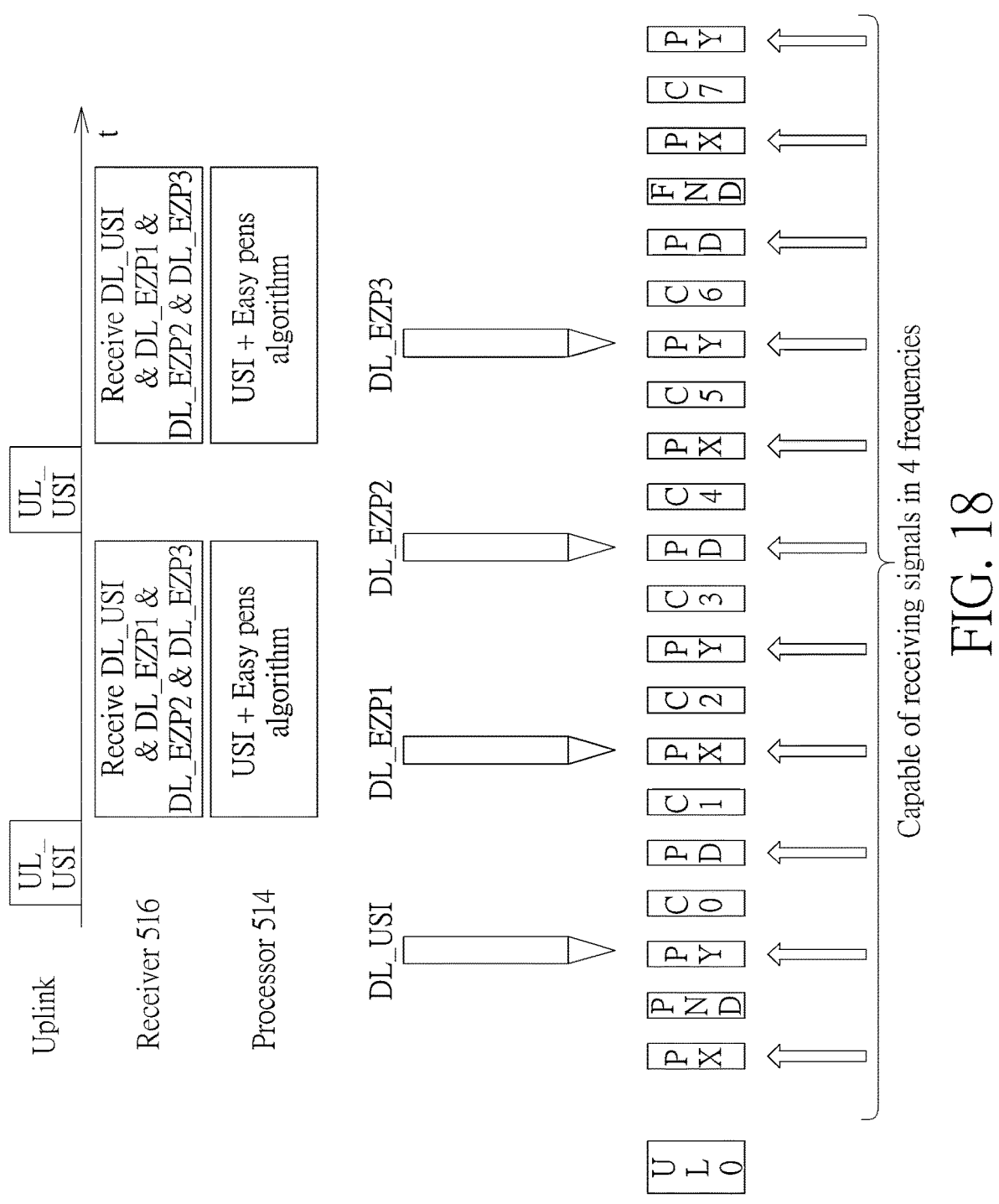

Since the touch control system may support different types of styluses operated in at most 4 different frequencies, in another embodiment, the stylus control circuit 510 may detect and receive downlink signals from 1 active stylus and 3 different easy pens. For example, as shown in FIG. 18, the stylus control circuit 510 is capable of detecting the downlink signals DL_USI output from a USI stylus and the downlink signals DL_EZP1, DL_EZP2 and DL_EZP3 output from 3 different easy pens, which may be detected and received in the same or different time slots among those downlink slots PX, PY and PD.

Note that the capability of the touch control system supporting 4 frequencies is merely an example. In another embodiment, the touch control system may support more different frequencies, and the frequency capability and related configurations are not limited to those described in this disclosure.

In another embodiment, the touch control system may support more than one easy pen without considering the active styluses. In such a situation, the stylus control circuit 510 may perform detection on the easy pens without outputting any uplink signal.

Figure 19:
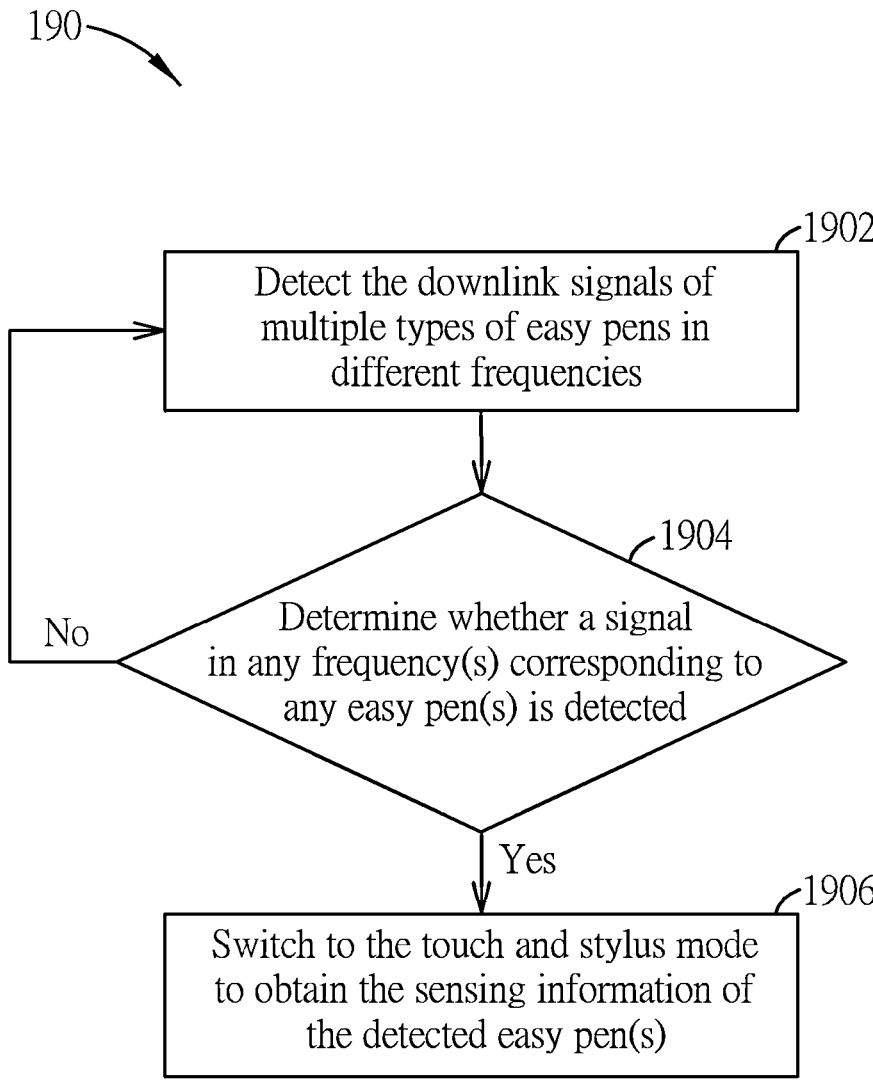
FIG. 19 is a flowchart of a process according to an embodiment of the present invention.

FIG. 19 is a flowchart of a process 190 according to an embodiment of the present invention. The process 190 specifies the operations of a stylus control circuit such as the stylus control circuit 510 of FIG. 5, to control a plurality of types of styluses, which include multiple types of easy pens operated in different frequencies. As shown in FIG. 19, the process 190 includes the following steps:

Step 1902: Detect the downlink signals of multiple types of easy pens in different frequencies.

Step 1904: Determine whether a signal in any frequency(s) corresponding to any easy pen(s) is detected. If yes, go to Step 1906; otherwise, go to Step 1902.

Step 1906: Switch to the touch and stylus mode to obtain the sensing information of the detected easy pen(s).

According to the process 190, the stylus control circuit 510 may detect the easy pens by detecting the downlink signals in different frequencies (Step 1902). For example, assuming that the touch control system supports two types of easy pens, including a first type and a second type. The stylus control circuit 510 may detect the first type of easy pen by detecting a first downlink signal corresponding to the first type of easy pen, and detect the second type of easy pen by detecting a second downlink signal corresponding to the second type of easy pen.

Therefore, the stylus control circuit 510 may determine whether a signal in the frequency(s) of any of the easy pens is detected (Step 1904). If there is a signal received in any frequency(s) of the easy pen(s) (or the signal strength detected in any frequency(s) of the easy pen(s) is greater than a predetermined threshold), the touch control system may enter the touch and stylus mode, to obtain various sensing information of the detected easy pen(s) (Step 1906). In such a situation, the stylus control circuit 510 may start to communicate with the detected easy pen(s). For example, if the first downlink signal corresponding to the first type of easy pen is received, the stylus control circuit 510 may start to communicate with an easy pen of the first type, and/or if the second downlink signal corresponding to the second type of easy pen is received, the stylus control circuit 510 may start to communicate with an easy pen of the second type.

Figure 20:
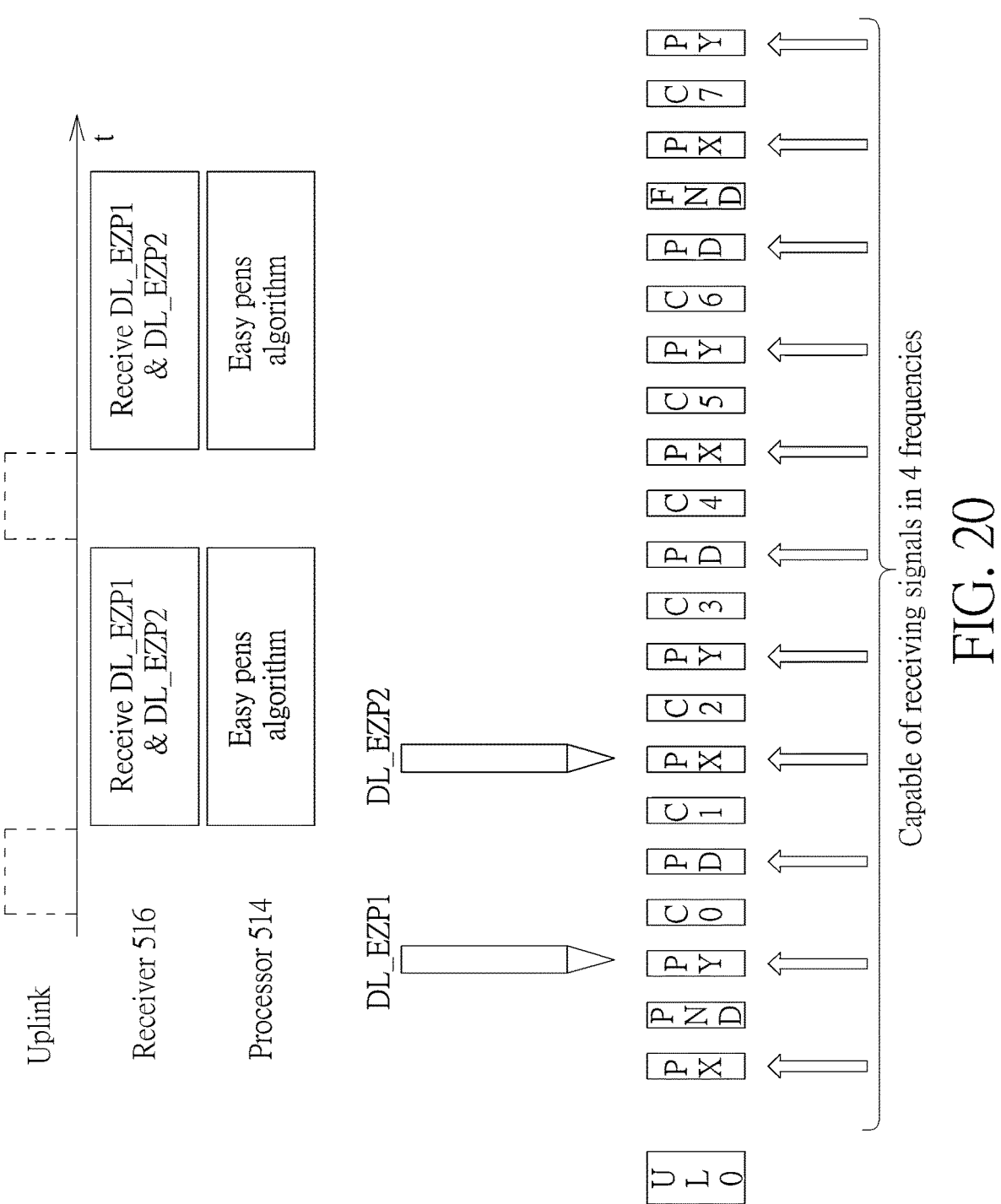
FIG. 20 and FIG. 21 are timing diagrams of controlling multiple easy pens according to embodiments of the present invention.

FIG. 20 is a timing diagram of controlling multiple easy pens according to an embodiment of the present invention. In this embodiment, it is assumed that the touch control system supports two different types of easy pens that may be operated in different frequencies, and the stylus control circuit 510 may detect that there are two easy pens simultaneously operated on the touch panel. In such a situation, the receiver 516 of the stylus control circuit 510 may detect and receive the downlink signals DL_EZP1 and DL_EZP2 from the two easy pens, respectively. Correspondingly, the processor 514 may perform the algorithms corresponding to the detected easy pens to obtain various sensing information of the easy pens. Similarly, the receiver 516 and the processor 514 may also perform touch sensing operations similar to those described in the above embodiments, which will not be detailed herein for brevity.

The downlink signals DL_EZP1 and DL_EZP2 for different easy pens may be in different frequencies. In this embodiment, the downlink slots PX, PY and PD which are used for stylus detection may be applied to receive the downlink signals DL_EZP1 and DL_EZP2 in different frequencies. As mentioned above, the stylus control circuit 510 is capable of performing detection and receiving related downlink signals in 4 frequencies, for example; hence, one of these 4 frequencies may be used to detect and receive the downlink signal DL_EZP1, and another one may be used to detect and receive the downlink signal DL_EZP2. Each of the downlink signals DL_EZP1 and DL_EZP2 may be detected in any of the downlink slots PX, PY and PD, and these two downlink signals DL_EZP1 and DL_EZP2 may be detected and received in the same or different time slots.

Figure 21:
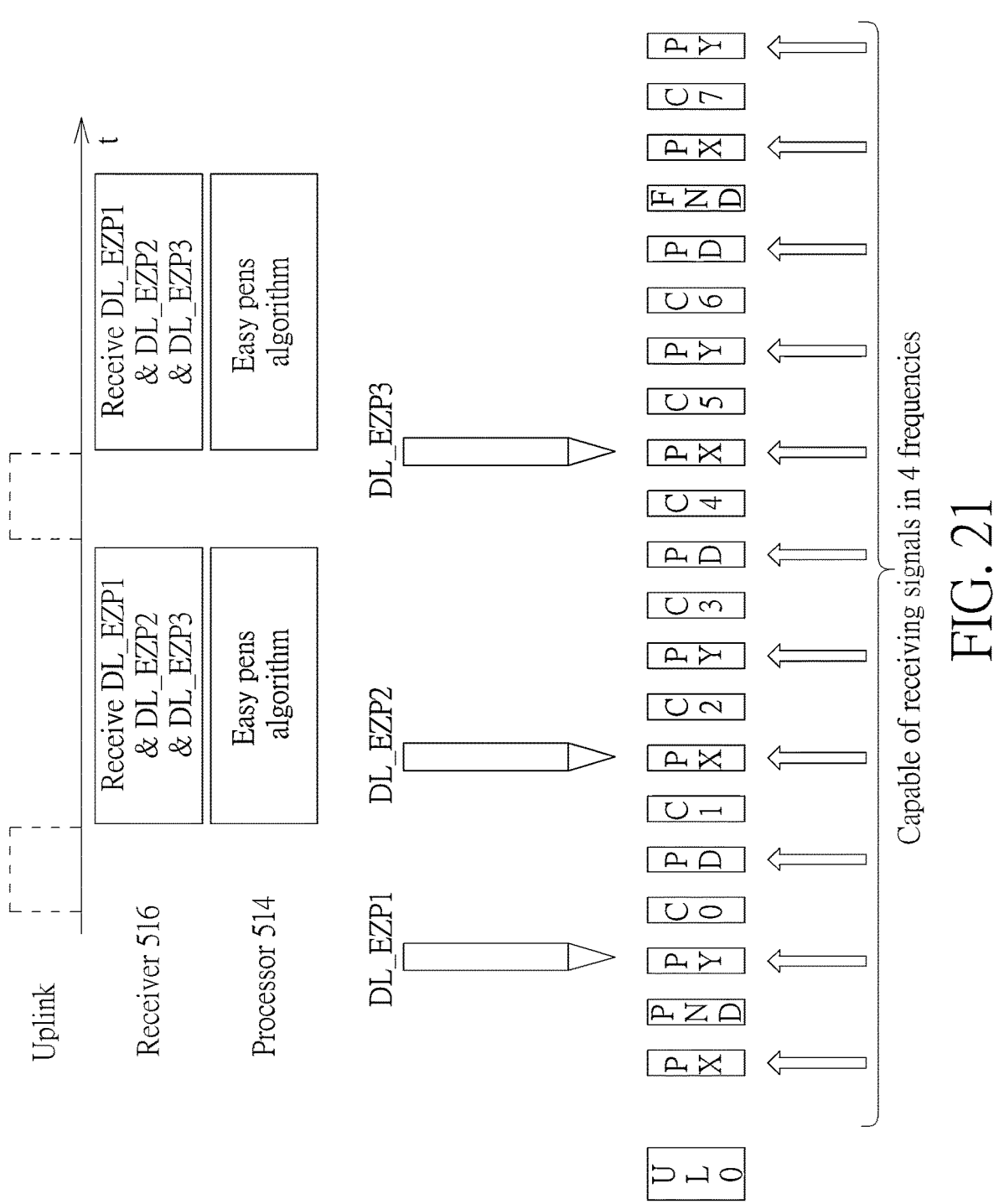

In a similar manner, if the stylus control circuit 510 has the capability of detecting 4 different frequencies, the related touch control system may support at most 4 different types of styluses. For example, as shown in FIG. 21, the stylus control circuit 510 is capable of detecting the downlink signals DL_EZP1, DL_EZP2 and DL_EZP3 output from 3 different easy pens, which may be detected and received in the same or different time slots.

Please note that the present invention aims at providing a novel method of controlling different types of styluses including active styluses and easy pens, and providing a related stylus control circuit to realize the control method. Those skilled in the art may make modifications and alterations accordingly. For example, in the above embodiments, the timing allocations are associated with the TDDI system where the display operations, the touch sensing operations, and the stylus sensing operations are integrated in the same TDDI circuit and performed time-divisionally. In another embodiment, the implementations of controlling multiple types of styluses may be applied to an out-cell touch panel or any other touch sensing techniques other than the TDDI control. Based on the applied touch sensing techniques, the allocations of time slots may be modified accordingly. For example, in an embodiment, the time slots for touch sensing and stylus sensing may be allocated without preserving the display time, and the related implementations should belong to the scope of the present invention. In addition, the timing allocations in the touch mode and in the touch and stylus mode described in the above embodiments are merely examples for illustrations. In fact, the time slots may be allocated in any appropriate manner, which should not limit the scope of the present invention.

Further, in various embodiments of the present invention, the easy pen detection may be performed in any downlink slots, which should not be limited to the downlink slots PX, PY and PD in the above embodiments as shown in FIGS. 16-18 and 20-21.

Figure 22:
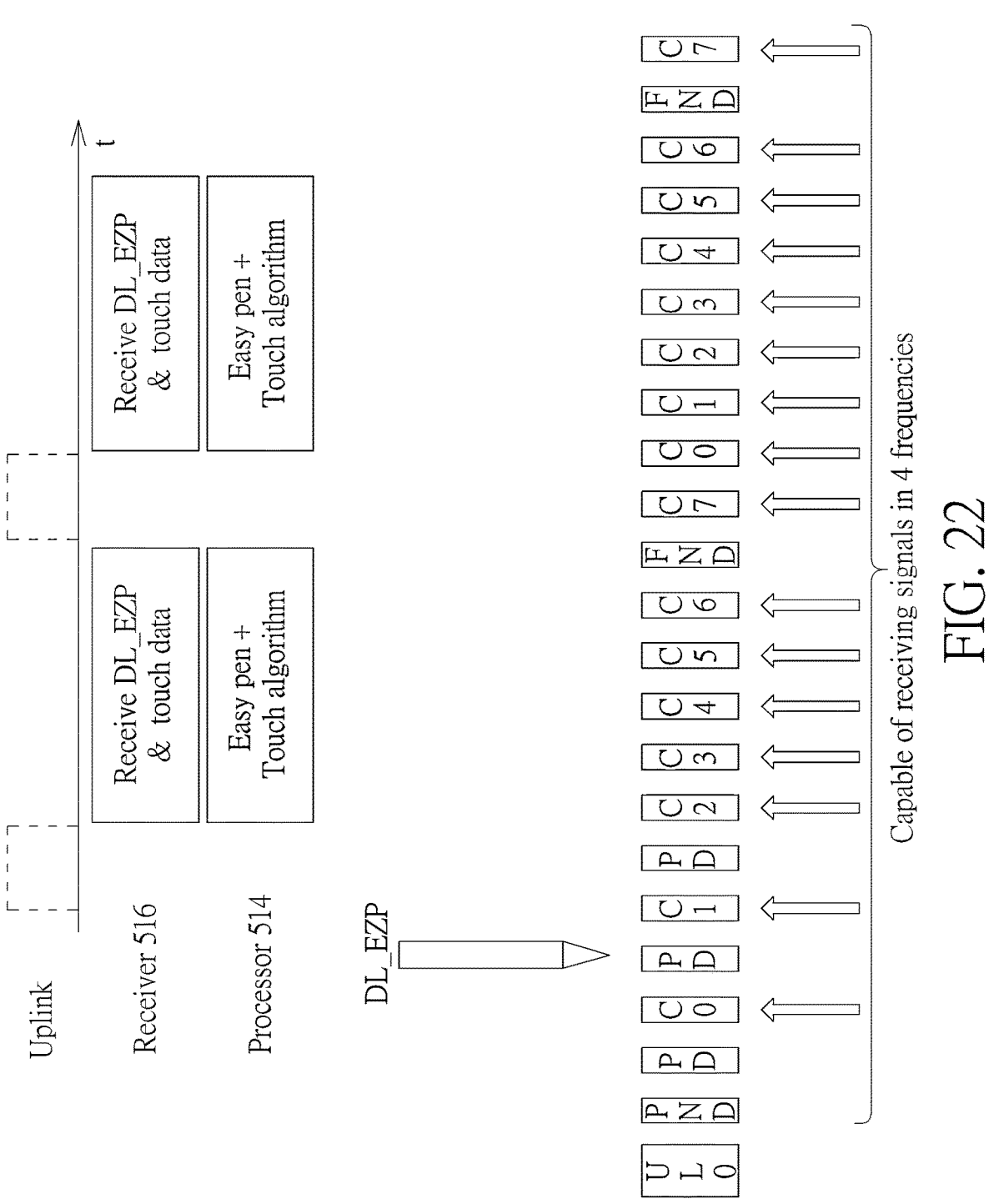
FIG. 22 to FIG. 24 are timing diagrams of performing easy pen detection in the time slots for touch sensing according to embodiments of the present invention.

FIG. 22 is a timing diagram of performing easy pen detection in the time slots for touch sensing according to an embodiment of the present invention. In this embodiment, the downlink signal DL_EZP of the easy pen may be detected in the downlink slot C0, and then received in the downlink slots C0-C7 used for finger touch sensing. In other words, the finger touch signals and the downlink signal DL_EZP may be detected and received in the same downlink slots C0-C7. Since the stylus control circuit 510 is capable of detecting 4 frequencies simultaneously, one of these 4 frequencies may be used to detect and receive the finger touch signals, and another one may be used to detect the easy pen by receiving the downlink signal DL_EZP.

Figure 23:
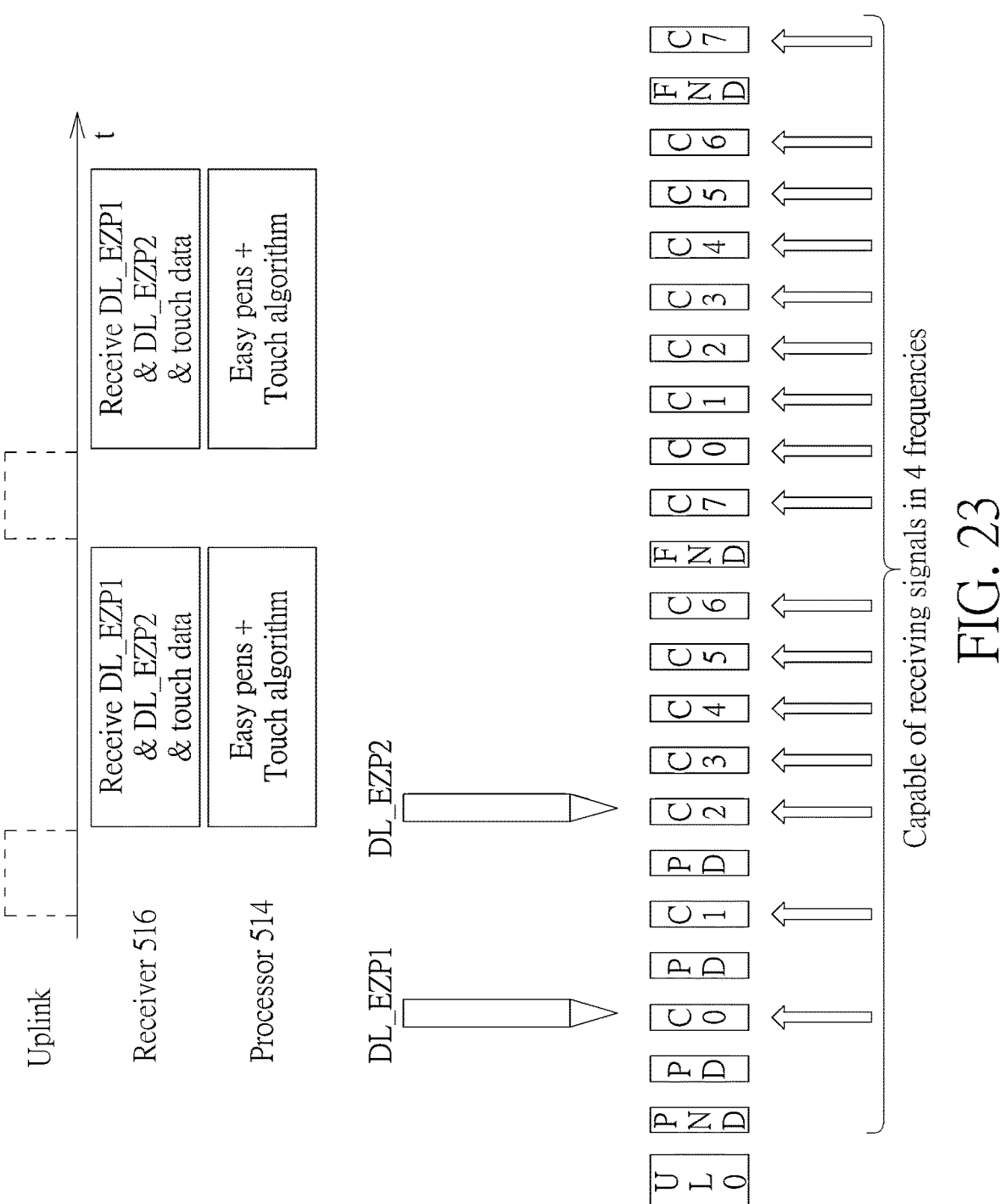

Under the scenarios where the stylus control circuit 510 is capable of detecting 4 different frequencies, if the easy pen detection is performed in the time slots for finger touch detection, while one of these 4 frequencies is used to detect and receive the finger touch signals, the other 3 frequencies may be used to detect the easy pens. In such a situation, the touch control system may support at most 3 different types of easy pens. For example, as shown in FIG. 23, in addition to the first easy pen (which outputs the downlink signal DL_EZP1 in a first frequency such as 485 kHz), the stylus control circuit 510 may also detect a second easy pen by detecting another downlink signal DL_EZP2 in a second frequency such as 285 kHz, which may be different from the first frequency. The downlink signals DL_EZP1 and DL_EZP2 may be detected and received in the same or different time slots among those downlink slots C0-C7.

In another embodiment, the stylus control circuit 510 may detect and receive downlink signals from 3 different easy pens. For example, as shown in FIG. 24, the stylus control circuit 510 is capable of detecting the downlink signals DL_EZP1, DL_EZP2 and DL_EZP3 output from 3 different easy pens, which may be detected and received in the same or different time slots among those downlink slots C0-C7.

Figure 24:
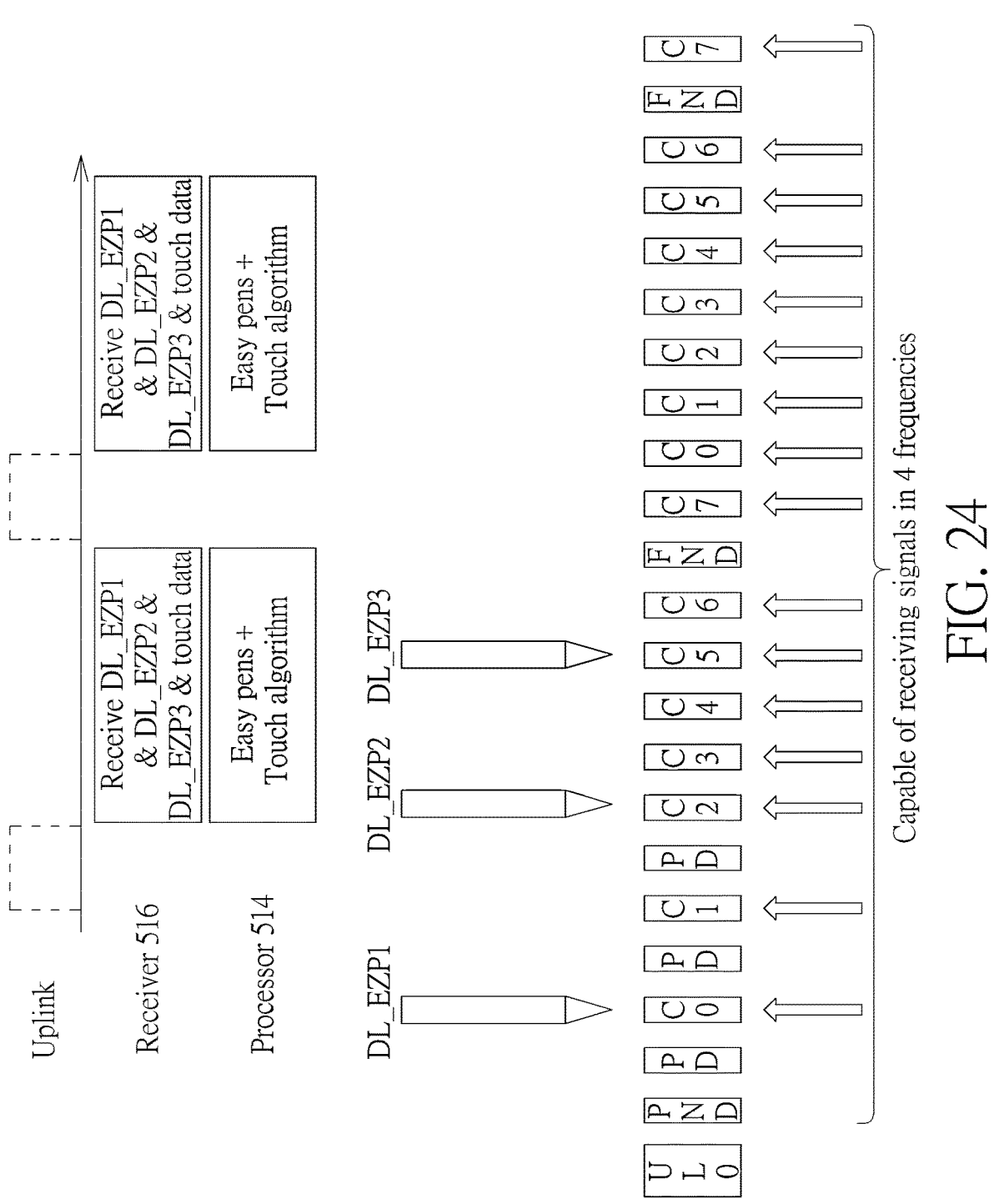

Note that in the embodiments shown in FIGS. 22-24, the time slot allocation is used for the touch mode. In other words, the easy pen detection may be performed in the touch mode. Therefore, even after an easy pen is detected, the touch control system may still stay in the touch mode instead of entering the touch and stylus mode, and the downlink signal of the easy pen may be continuously received.

In various embodiments, the easy pen detection performed in the downlink slots C0-C7 used for touch sensing may also be integrated with the active stylus detection. For example, a USI stylus and/or a WGP stylus may be detected in the downlink slots PX, PY and PD, while the finger touch sensing and the easy pen detection may be performed in the downlink slots C0-C7.

In another embodiment, in order to support more types of styluses, the detection may be performed and allocated appropriately in multiple time slots. For example, the touch control system is requested to support 5 or more types of styluses (including active styluses and/or easy pens) having different frequencies, but the stylus control circuit 510 is capable of detecting at most 4 frequencies at the same time. In such a situation, 3 types of styluses may be detected and the related downlink signals may be received in the downlink slots PX, PY and PD, and other 2 types of styluses may be detected and the related downlink signals may be received in the downlink slots C0-C7.

To sum up, the present invention provides a method of controlling multiple types of styluses including at least one active stylus and at least one unidirectional stylus. The active stylus may be a stylus with a protocol, which includes, but not limited to, a USI stylus and a WGP stylus. The unidirectional stylus may be a stylus that outputs downlink signals in one or more predetermined frequencies without receiving any uplink signals, such as an easy pen. The stylus control circuit may detect the active stylus by outputting an uplink signal with the specification of the stylus and detect a downlink signal in response to the uplink signal, and may detect the easy pen by detecting the downlink signal in the predetermined frequency (e.g., by performing demodulation using this frequency).

In various embodiments, the touch control system may support more than two active styluses, and thus the stylus control circuit may output the uplink signals for these active styluses alternately. After a specific active stylus is detected, the stylus control circuit may change to only output the corresponding uplink signal and perform related detection continuously. In various embodiments, the touch control system may support more than two easy pens, which may be detected in any time slot, e.g., the same time slot or different time slots, by detecting different frequencies simultaneously. In various embodiments, the stylus control circuit may communicate with multiple styluses simultaneously operated on the touch panel. The above embodiments may be combined in an appropriate manner, so that the stylus control circuit may perform detection on both the active stylus(s) and the easy pen(s). Through various embodiments of the present invention, the touch control system may control various types of styluses effectively and flexibly.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for controlling a plurality of types of styluses, comprising:

outputting a first uplink signal corresponding to a first type of stylus among the plurality of types of styluses, to detect the first type of stylus;

outputting a second uplink signal corresponding to a second type of stylus among the plurality of types of styluses, to detect the second type of stylus;

receiving a setting signal; and outputting only an uplink signal corresponding to one type among the plurality of types of styluses according to the setting signal after receiving the setting signal;

wherein the second type is different from the first type.

2. The method of claim 1, wherein the first uplink signal and the second uplink signal are output alternately in a series of time slots.

3. The method of claim 1, further comprising:
outputting only the first uplink signal after a first stylus of the first type is detected; or
outputting only the second uplink signal after a second stylus of the second type is detected.

4. The method of claim 3, further comprising:
starting to communicate with the first stylus according to a first protocol of the first type of stylus after the first stylus is detected; or
starting to communicate with the second stylus according to a second protocol of the second type of stylus after the second stylus is detected.

5. The method of claim 1, further comprising:
stopping outputting the first uplink signal when a second stylus of the second type is detected.

6. The method of claim 5, further comprising:
restarting to output the first uplink signal after not receiving a downlink signal of the second stylus for a specific period of time.

7. The method of claim 1, further comprising:
outputting a third uplink signal corresponding to a third type of stylus among the plurality of types of styluses, to detect the third type of stylus;
wherein the third type is different from the first type and the second type.

8. The method of claim 1, wherein the setting signal indicates the first type of stylus, and the method further comprises:
outputting only the first uplink signal corresponding to the first type of stylus after receiving the setting signal; and
after not receiving a downlink signal corresponding to the first type of stylus for a specific period of time, outputting the second uplink signal corresponding to the second type of stylus.

9. The method of claim 1, further comprising:
outputting the first uplink signal and the second uplink signal alternately when a first stylus of the first type and a second stylus of the second type are detected.

10. The method of claim 1, wherein the first type of stylus comprises a first active stylus with a first protocol, and the second type of stylus comprises a second active stylus with a second protocol different from the first protocol.

11. A stylus control circuit to control a plurality of types of styluses, the stylus control circuit being to:
output a first uplink signal corresponding to a first type of stylus among the plurality of types of styluses, to detect the first type of stylus;
output a second uplink signal corresponding to a second type of stylus among the plurality of types of styluses, to detect the second type of stylus;
receive a setting signal; and
output only an uplink signal corresponding to one type among the plurality of types of styluses according to the setting signal after receiving the setting signal;
wherein the second type is different from the first type.

12. A method for controlling a plurality of types of styluses, comprising:
outputting a first uplink signal corresponding to a first type of stylus among the plurality of types of styluses;
detecting the first type of stylus by detecting a first downlink signal in response to the first uplink signal; and
detecting a second type of stylus among the plurality of types of styluses by detecting a second downlink signal corresponding to the second type of stylus without transmitting any uplink signal;
wherein the second type is different from the first type.

13. The method of claim 12, wherein the steps of detecting the first type of stylus and detecting the second type of stylus comprise:
detecting the first downlink signal and the second downlink signal in a same time slot.

14. The method of claim 12, wherein the steps of detecting the first type of stylus and detecting the second type of stylus comprise:
detecting the first downlink signal and the second downlink signal alternately in a series of time slots.

15. The method of claim 12, further comprising:
starting to communicate with a first stylus of the first type according to a protocol of the first type of stylus after the first downlink signal is received.

16. The method of claim 12, further comprising:
starting to communicate with a second stylus of the second type according to a frequency of the second type of stylus after the second downlink signal is received.

17. The method of claim 12, further comprising:
stopping outputting the first uplink signal when a second stylus of the second type is detected.

18. The method of claim 17, further comprising:
restarting to output the first uplink signal after not receiving the second downlink signal for a specific period of time.

19. The method of claim 12, further comprising:
outputting a third uplink signal corresponding to a third type of stylus among the plurality of types of styluses; and
detecting the third type of stylus by detecting a third downlink signal in response to the third uplink signal;
wherein the third type is different from the first type and the second type.

20. The method of claim 12, further comprising:
detecting a fourth type of stylus among the plurality of types of styluses by detecting a fourth downlink signal corresponding to the fourth type of stylus;
wherein the fourth type is different from the first type and the second type.

21. The method of claim 20, wherein the steps of detecting the first type of stylus, detecting the second type of stylus, and detecting the fourth type of stylus comprise:
detecting the first downlink signal, the second downlink signal and the fourth downlink signal in a same time slot or different time slots.

22. The method of claim 20, wherein the second downlink signal is in a first frequency, and the fourth downlink signal is in a second frequency different from the first frequency.

23. The method of claim 12, further comprising:
detecting a touch signal and the second downlink signal in a same time slot.

24. The method of claim 12, wherein the first type of stylus comprises an active stylus with a first protocol, and the second type of stylus comprises a unidirectional stylus.

25. A stylus control circuit to control a plurality of types of styluses, the stylus control circuit being to:
output a first uplink signal corresponding to a first type of stylus among the plurality of types of styluses;
detect the first type of stylus by detecting a first downlink signal in response to the first uplink signal; and
detect a second type of stylus among the plurality of types of styluses by detecting a second downlink signal corresponding to the second type of stylus without transmitting any uplink signal;
wherein the second type is different from the first type.

26. A method for controlling a plurality of types of styluses, comprising:

detecting a first type of stylus among the plurality of types of styluses by detecting a first downlink signal corresponding to the first type of stylus; and detecting a second type of stylus among the plurality of types of styluses by detecting a second downlink signal corresponding to the second type of stylus;

wherein the second type is different from the first type;

wherein at least one of the first type of stylus and the second type of stylus is a unidirectional stylus.

27. The method of claim 26, wherein the steps of detecting the first type of stylus and detecting the second type of stylus comprise:

detecting the first downlink signal and the second downlink signal in a same time slot or different time slots.

28. The method of claim 26, further comprising:

starting to communicate with a first stylus of the first type according to a first frequency of the first type of stylus after the first downlink signal is received; or starting to communicate with a second stylus of the second type according to a second frequency of the second type of stylus after the second downlink signal is received.

29. The method of claim 26, further comprising:

outputting an uplink signal corresponding to a third type of stylus among the plurality of types of styluses; and detecting the third type of stylus by detecting a third downlink signal in response to the uplink signal;

wherein the third type is different from the first type and the second type.

30. The method of claim 29, wherein the steps of detecting the first type of stylus, detecting the second type of stylus, and detecting the third type of stylus comprise:

detecting the first downlink signal, the second downlink signal and the third downlink signal in a same time slot or different time slots.

31. The method of claim 26, further comprising:

detecting a touch signal and at least one of the first downlink signal and the second downlink signal in a same time slot.

32. The method of claim 26, wherein the first downlink signal is in a first frequency, and the second downlink signal is in a second frequency different from the first frequency.

33. The method of claim 26, wherein the first type of stylus comprises a first unidirectional stylus, and the second type of stylus comprises a second unidirectional stylus.

34. A stylus control circuit to control a plurality of types of styluses, the stylus control circuit being to:

detect a first type of stylus among the plurality of types of styluses by detecting a first downlink signal corresponding to the first type of stylus; and detect a second type of stylus among the plurality of types of styluses by detecting a second downlink signal corresponding to the second type of stylus;

wherein the second type is different from the first type;

wherein at least one of the first type of stylus and the second type of stylus is a unidirectional stylus.

* * * * *